United States Patent
Heo et al.

(10) Patent No.: US 12,532,988 B2
(45) Date of Patent: Jan. 27, 2026

(54) BLENDER

(71) Applicant: LG ELECTRONICS INC., Seoul (KR)

(72) Inventors: Jea Shik Heo, Seoul (KR); Seung Je Park, Seoul (KR); Youn Seok Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 635 days.

(21) Appl. No.: 17/917,779

(22) PCT Filed: Apr. 23, 2021

(86) PCT No.: PCT/KR2021/005149
§ 371 (c)(1),
(2) Date: Oct. 7, 2022

(87) PCT Pub. No.: WO2021/225312
PCT Pub. Date: Nov. 11, 2021

(65) Prior Publication Data
US 2023/0137076 A1    May 4, 2023

(30) Foreign Application Priority Data
May 6, 2020 (KR) .................. 10-2020-0053896

(51) Int. Cl.
*A47J 43/046* (2006.01)
*A47J 43/07* (2006.01)
*A47J 43/08* (2006.01)

(52) U.S. Cl.
CPC ......... *A47J 43/046* (2013.01); *A47J 43/0777* (2013.01); *A47J 43/085* (2013.01)

(58) Field of Classification Search
CPC ........................... A47J 43/046; A47J 43/0777
See application file for complete search history.

(56) References Cited

U.S. PATENT DOCUMENTS

| | | | |
|---|---|---|---|
| 2015/0265983 A1* | 9/2015 | Fleming | B01F 35/2131 366/206 |
| 2017/0095122 A1* | 4/2017 | Hoare | A23N 1/003 |
| 2018/0020875 A1* | 1/2018 | Kolar | A47J 43/0777 366/279 |
| 2019/0282024 A1* | 9/2019 | Perentes | A47J 31/4403 |

FOREIGN PATENT DOCUMENTS

EP    0046169 A1    2/1982

* cited by examiner

*Primary Examiner* — Elizabeth Insler
(74) *Attorney, Agent, or Firm* — Bryan Cave Leighton Paisner LLP

(57) ABSTRACT

Proposed is a blender, in which a main body operates when a closure of a container lid on a container body is detected. In the blender according to the present disclosure, when the closure of the container lid is detected, a voltage is transferred from a first inductive coil of the main body to a second inductive coil of the container body. By using the voltage transferred to the second inductive coil, a light emitting unit of the container body transmits a light signal to a light receiving unit of the main body, and the light signal has a predetermined signal pattern. When the light receiving unit receives the light signal of the signal pattern, the main body recognizes the closure of the container lid on the container body such that the main body operates.

16 Claims, 18 Drawing Sheets

BLENDER

CROSS-REFERENCE TO RELATED APPLICATIONS

This application is the National Stage filing under 35 U.S.C. of International Application No. PCT/KR2021/005149, filed on Apr. 23, 2021, which claims the benefit of earlier filing date and right of priority to Korean Application No. 10-2020-0053896, filed on May 6, 2020, the contents of which are all hereby incorporated by reference herein in their entirety.

TECHNICAL FIELD

The present disclosure relates to a blender. More particularly, the present disclosure relates to a blender in which a main body operates when the closure of a container lid of a container body is detected.

BACKGROUND ART

Generally, a blender is a household appliance which chops or crushes food received in a container body by blades rotated by an electric motor, and is also commonly referred to as a food mixer.

In such a blender, the container body is seated on the upper surface of a main body in which the motor is provided, and when the container body is seated, the blades provided in the container body are connected to a rotating shaft of the motor to be rotatable.

After a user puts food in the container body through an open portion of the container body and closes a container lid thereof, the user operates the motor by manipulating the main body to rotate the blades such that the food is crushed.

The container lid closes the open portion of the container body to protect food inside the container body. It is a very important factor in the operation of a blender whether or not the container lid closes the open portion of the container.

For safety during the operation of the blender, the blades are not rotated in a state in which the container lid does not close the container body. That is, to prevent accidents due to the blades, the blades are preferably allowed to be rotated only when the closure of the container lid on the container body is detected.

Conventionally, various methods of detecting the closure of a container lid have been proposed.

For example, in the related art, a push rod physically connecting the container body with the blender body is provided, and when the container lid closes the container body, the container lid presses against the push rod. A press detection part of the main body detects the pressing of the container lid, and detects the closure of the container lid.

However, the push rod and the press detection part are required to be separately installed, and the press detection part may be contaminated due to moisture or food that may enter the press detection part.

In addition, the push rod of the container body and the press detection part of the main body are required to be installed at positions corresponding to each other, so there is a problem in that the container body is required to be mounted only in a specific direction.

Additionally, the push rod is required to be installed along the container body in a longitudinal direction thereof from the container body to the main body, so the design of the container body made of a transparent material cannot be maintained.

Recently, in order to solve this problem, a technique of detecting the closure of the container lid of the container body by the main body using wireless communication or electromagnetic coupling between the container body and the main body has been disclosed.

For example, in European Patent No. EP2548485, when a container lid closes the container body, a blender detecting the closure of the container lid of the container body by the main body by using a wireless communication module is disclosed.

However, in such a prior art, the wireless communication module is required, and a separate power supply is required to be provided in the container body so as to drive the wireless communication module.

In another example, in US Patent Application Publication No. 20180020875, an interlocking blender is disclosed in which a transmitting coil and a receiving coil are disposed in the main body, and a receiving coil and a transmitting coil are disposed in the container body so as to correspond to the transmitting coil and receiving coil, respectively, and when a container lid closes the container body, power is transmitted to the receiving coil of the container body through the transmitting coil of the main body, and in turn, the power is transmitted to the receiving coil of the main body through the transmitting coil of the container body, so that the main body detects the closure of the container lid of the container body.

However, in such a prior art, two coils, that is, a transmitting coil and a receiving coil, are required to be installed in each of the main body and the container body, and a device analyzing power received by the receiving coil of the main body is required.

In addition, two coils are arranged in each of the main body and the container body, and when electric current flows through each coil, induced currents change due to interference between magnetic fields induced in the coils. Accordingly, it is difficult to accurately analyze power received by the receiving coil of the main body.

Furthermore, power is transmitted from the transmitting coil of the main body to the receiving coil of the container body, and due to the closure of a container lid of the container body, the power is transmitted from the transmitting coil of the container body to the receiving coil of the main body. In order to allow the receiving coil of the main body to receive effective power, high power is required to be transmitted from the transmitting coil of the main body to the receiving coil of the container body.

Additionally, to electrically connect a detection circuit for detecting the closure of the container lid of the container body with the main body, a conductive member is installed along the transparent container body, and thus the design of the transparent container body is spoiled.

DOCUMENTS OF RELATED ART (Patent Document 1) U.S. Pat. No. 6,910,800
(Patent Document 2) U.S. Pat. No. 7,871,196
(Patent Document 3) EP2548485
(Patent Document 4) US20180020875

DISCLOSURE

Technical Problem

The present disclosure is intended to propose a blender in which one inductive coil may be disposed in a main body and one inductive coil may be disposed in a container body and by performing wireless power transmission through one inductive coupling between the two inductive coils, the closure of a container lid of the container body is detected.

The present disclosure is intended to propose a blender in which a detection error or contamination due to external contaminants such as water or food is prevented.

The present disclosure is intended to propose a blender in which the design of the container body made of a transparent material and the transparency of the container body are maintained.

The present disclosure is intended to propose a blender in which the closure of the container lid of the container body is accurately detected with low power.

The present disclosure is intended to propose a blender in which inductive coils mounted to the main body and the container body, respectively, are configured to be removable therefrom.

The present disclosure is intended to propose a blender in which the main body and the container body may transmit and receive a light signal to detect the closure of the container lid on the container body.

The present disclosure is intended to propose a blender in which a unique pattern preset by a user is mixed with a signal pattern of the output light signal so that the light signal emitted by the closure of the container lid on the container body and a light signal from the outside may be clearly distinguished.

The present disclosure is intended to propose a blender in which a pattern of a light signal may be implemented by a simple application without the application of MCU.

The objects of the present disclosure are not limited to the above-mentioned objects, and other objects not mentioned will be clearly understood by those skilled in the art from the following description.

Technical Solution

In a blender of the present disclosure, through one-time inductive coupling between a first inductive coil mounted to a main body and a second inductive coil mounted to a container body, a light signal may be transmitted/received between a light emitting unit installed in the container body and a light receiving unit installed in the main body.

In the blender of the present disclosure, according to the closure of the container lid on the container body, inductive coupling between the first inductive coil and the second inductive coil of the container body may be performed.

In the blender of the present disclosure, power may be generated in the second inductive coil by inductive coupling between the first inductive coil of the main body and the second inductive coil of the container body, and the light emitting unit transmits a light signal to the light receiving unit by using the generated power.

In the blender of the present disclosure, when the container lid closes the container body, a detection module disposed in the container body may detect the closure of the container lid, and when the closure of the container lid is detected by the detection module, inductive coupling between the first and second inductive coils may be performed.

In the blender of the present disclosure, by mixing signals having different frequencies and supplying a voltage signal having a new signal pattern to the light emitting unit, the light signal transmitted from the light emitting unit may have a predetermined signal pattern.

In this case, the signal pattern includes a unique pattern preset by a user such that the signal pattern may be distinguished from a light signal supplied from another external light source.

In an embodiment of the present disclosure, the container body may include a driving unit for driving the light emitting unit, and the driving unit comprises: a rectifying unit for rectifying the supplied AC voltage into a DC voltage; a first oscillation unit that generates a first signal having a first frequency; a second oscillation unit that generates a second signal having a second frequency; a mixer that mixes the first and second signals to output a signal of a new pattern; and a switching unit that is turned on/off in response to the signal pattern to supply a DC voltage to the light emitting unit according to the signal pattern.

In addition, in another embodiment of the present disclosure, the container body may include a driving unit for driving the light emitting unit, and the driving unit comprises: a rectifying unit for rectifying the supplied AC voltage into a DC voltage; a first oscillation unit that generates a first signal having a first frequency; a signal receiving unit that receives a second signal having a second frequency input from the outside; a mixer that mixes the first and second signals to output a signal of a new pattern; and a switching unit that is turned on/off in response to the signal pattern to supply a DC voltage to the light emitting unit according to the signal pattern.

As described above, by mixing the second signal having a unique pattern preset by the user and the first signal generated therein to generate a new signal pattern, the light emitting unit may transmit a light signal according to the new signal pattern.

As an example in the present disclosure, the first and second frequencies are 30 to 45 kHz and 0.5 to 5 kHz, respectively.

The present disclosure may further include an LDO unit for controlling the DC voltage output from the rectifying unit to follow a preset reference voltage. Accordingly, a stable voltage may be supplied to the first and second oscillation units and the light emitting unit for stabilizing the voltage output from the rectifying unit.

In the blender of the present disclosure, the detection module mounted to the upper part of the container body and the second inductive coil mounted to the lower part of the container body may be electrically connected to each other through a conductive member made of a transparent material disposed from the upper part of the container body to the lower part thereof in the longitudinal direction of the container body.

In the blender of the present disclosure, a transparent electrode film (ITO) may be used as the conductive member, and the conductive member may be disposed in the longitudinal direction of the transparent container body from the upper part of the container body to the lower part thereof.

In the blender of the present disclosure, the first end of the transparent electrode film may be electrically connected to the detection module by a first connector which is detachable, and the second end of the transparent electrode film may be electrically connected to the second inductive coil by a second connector which is detachable.

In the blender of the present disclosure, the first inductive coil and the second inductive coil may be disposed to be parallel to each other by facing each other such that the first inductive coil and the second inductive coil have the same center points, so inductive coupling between the first and second inductive coils may be effectively performed.

In the blender of the present disclosure, the first and second inductive coils may be configured to be patterned on first and second PCB substrates, respectively, so as to be disposed to have easy and simple configuration.

In the blender of the present disclosure, when the container body is mounted to the main body, the first and second PCB substrates may be installed to be parallel to each other by facing each other, such that the first and second inductive coils patterned on the first and second PCB substrates, respectively, have the same center points, so inductive coupling between the first and second inductive coils may be effectively performed.

In the blender of the present disclosure, the first and second PCB substrates may be attached to and detached from the main body and the container body, respectively, so inductive coils may be easily and simply replaced.

In the blender of the present disclosure, the light emitting unit includes a light source for emitting light, and the light receiving unit includes a light sensor for receiving light emitted from the light source, thereby enabling light transmission and reception even with low power.

In the blender of the present disclosure, when light is received from the light sensor, the closure of the container lid of the container body is detected to allow the main body to operate.

Advantageous Effects

The blender according to the present disclosure has the following effects.

First, in the blender of the present disclosure, the first inductive coil may be disposed on the upper part of the main body, and the second inductive coil may be disposed on the lower part of the container body, and thus according to the closure of the container lid, only one-time inductive coupling between the first and second inductive coils may be performed, thereby realizing simple control and operation and preventing interference of a magnetic field between the inductive coils compared to a prior art.

Second, in the blender of the present disclosure, a module and a device configured to detect the closure of the container lid of the container body may be installed inside the container body and the main body, thereby preventing a detection error or contamination due to external contaminants such as water or food.

Third, in the blender of the present disclosure, for electrical connection between modules, the transparent electrode film (ITO) may be used to be disposed inside and outside of the container body, thereby maintaining the design of the transparent container body.

Fourth, in the blender of the present disclosure, a light source and a light sensor may be used when detecting the closure of the container lid of the container body, thereby accurately detecting the closure of the container lid of the container body with low power.

Fifth, in the blender of the present disclosure, the first and second inductive coils may be patterned on PCB substrates, respectively, thereby having an easy and simple configuration.

Sixth, in the blender of the present disclosure, the first and second inductive coils mounted to the main body and the container body, respectively, may be attached thereto and detached therefrom, thereby enabling easy mounting and convenient replacement.

Seventh, in the blender of the present disclosure, a light signal is output from the container body by the closure of the container lid on the container body, and the light signal is received from the main body such that the closure of the container lid on the container body may be accurately detected.

Eighth, in the blender of the present disclosure, by mixing the signal pattern of the output light signal and a unique pattern preset by a user, it is possible to distinguish the light signal output by the closure of the container lid and a light signal from the outside, so that the closure of the container lid of the container body may be accurately detected.

Ninth, in the blender of the present disclosure, it is possible to prevent safety accidents by accurately detecting the closure of the container lid on the container body and allowing a blade installed inside the container body to be rotated only when the closure of the container lid on the container body is detected.

Tenth, in the blender of the present disclosure, since the pattern of the light signal may be implemented without the installation of an MCU for implementing the driving signal of the light source installed in the container body, there is an effect of reducing the manufacturing cost due to the non-application of the MCU.

MODE FOR INVENTION

Figure 1:
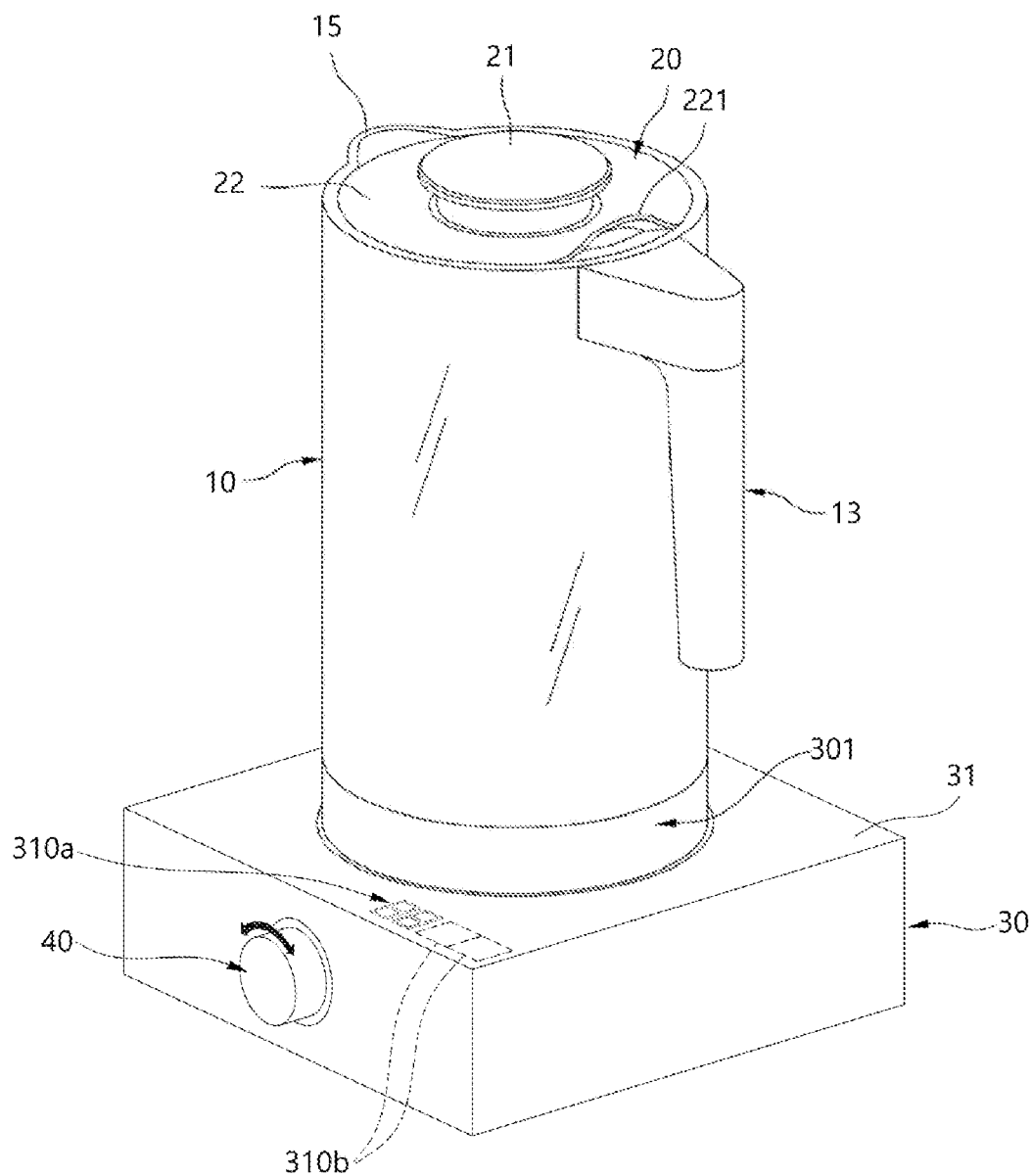
FIG. 1 is a perspective view of an exterior of a blender according to an embodiment of the present disclosure.

Advantages and features of the present disclosure and a method of achieving them will become apparent by referring to embodiments described below in detail in conjunction with the accompanying drawings. However, the present disclosure is not limited to the embodiments disclosed below and may be implemented in various different forms. The present embodiments are only provided to fully inform those of ordinary skill in the art to which the present disclosure belongs of the scope of the invention so that the disclosure of the present disclosure is complete. The present disclosure is defined by the scope of the claims. Like reference numerals refer to like elements throughout the specification.

Hereinafter, a blender of the present disclosure will be described in detail with reference to the accompanying drawings.

Figure 2:
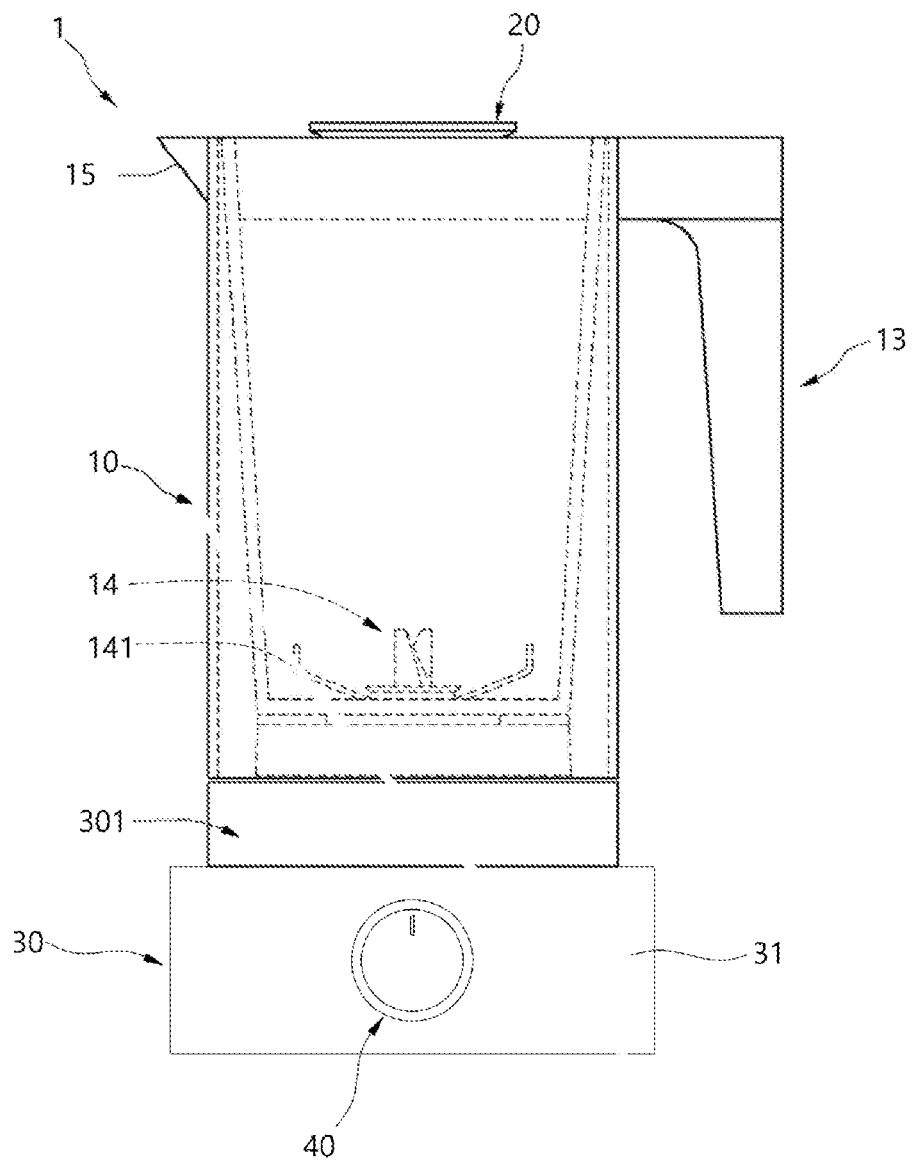
FIG. 2 is a front view of the blender.
Figure 3:
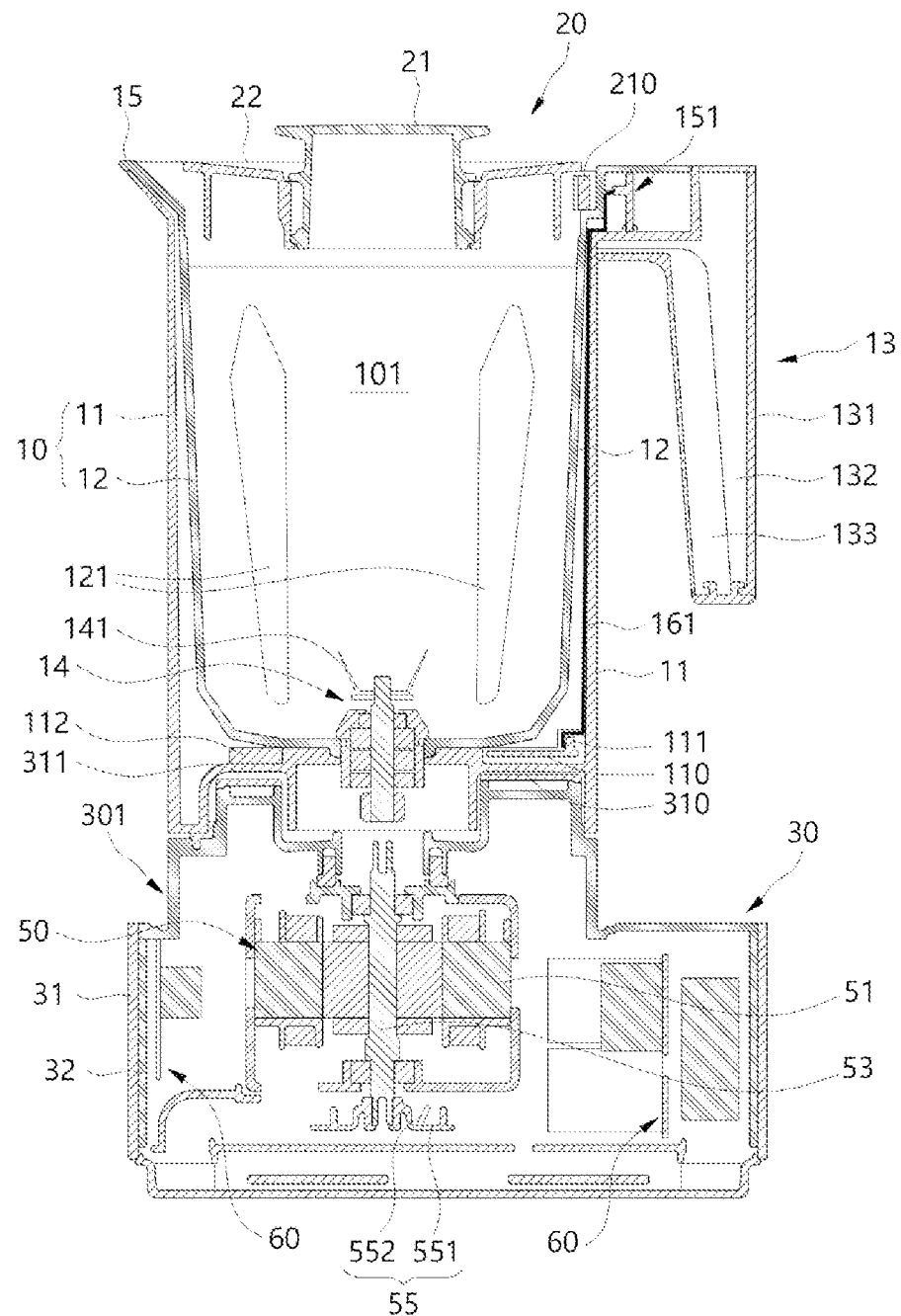
FIG. 3 is a vertical sectional view of the blender.

FIG. 1 is a perspective view of an exterior of a blender according to an embodiment of the present disclosure, FIG. 2 is a front view of the blender, and FIG. 3 is a vertical sectional view of the blender.

Referring to the drawings, the blender 1 according to the embodiment of the present disclosure may include a main body 30 disposed on a foundation surface, and a container body 10 seated on the upper part of the main body 30.

A motor assembly 50 for operating the blender 1, electrical devices including a control printed circuit board (PCB) module 60, and components may be disposed inside the main body 30.

The main body 30 may be provided with a manipulation part 40 and 310b for manipulating the operation of the blender 1, and a display part 310a for displaying the operation thereof.

The main body 30 may be configured to have a hexahedral shape as a whole, and a seating part 301 may be provided on the upper surface of the main body 30 so as to seat the container body 10 on the seating part 301. The seating part 301 may be configured such that the container body 10 is attached to and detached from the seating part 301 in a vertical direction.

The exterior of the main body 30 may be constituted by an outer casing 31 which is made of metal or has a metal texture, and the outer casing 31 may be configured to have a hexahedral shape having an open lower surface.

An inner casing 32 may be formed in the outer casing 31, and space in which the motor assembly 50 and the control PCB module 60 are mounted may be defined inside the inner casing 32.

A knob 40 may be provided on the front surface of the main body 30 such that a user sets the operation of the blender 1. The knob 40 may protrude from the front surface of the main body 30 and may manipulate and set the operation of the blender 1 by being rotated.

The display part 310a may be provided on the upper surface of the main body 30 so as to display the operation state of the blender 1. The display part 310a may be configured as at least one seven-segment display.

A touch manipulation part 40 and 310b may be provided on the upper surface of the main body 30 such that the start or stop of the operation of the blender 1 may be manipulated. In order to manipulate the blender 1, the manipulation part 40 and 310b may include at least any one of the knob 40 and a touch module (not shown).

The seating part 301 may be formed on the upper surface of the main body 30. The seating part 301 may protrude from the upper surface of the main body 30, and a portion of the seating part 301 may be inserted into the lower surface of the container body 10 so as to stably support the container body 10.

When the container body 10 is seated on the seating part 301, the motor assembly 50 may be coupled to a blade module 14 provided in the container body 10 and may transmit a rotational force to the blade module 14.

The seating part 301 may have an appearance formed of the same material as the outer casing 31. The seating part 301 may be formed of a metal material or a material having a metal texture to have a sense of unity with the appearance of the main body 30 as a whole.

The motor assembly 50 may be mounted inside the main body 30 located under the seating part 301. The motor assembly 50 is intended to rotate the blade module 14 installed inside the container body 10, and may drive a motor in the motor assembly 50 to rotate the blade module 14 at high speed.

The motor assembly 50 may control the rotation speed of the motor according to the manipulation of the knob 40 such that the rotation speed of the blade module 14 may be controlled.

A first coil PCB module 310 may be disposed on a first side of the upper surface of the seating part 301. The first coil PCB module 310 may include a first PCB substrate on which a first inductive coil is patterned by being wound multiple times. The first coil PCB module 310 may be connected to the control PCB module 60 and may receive power from the control PCB module 60.

The first PCB substrate may be attached to and detached from the main body 30. The attachment and detachment of the first PCB substrate may be enabled by the attachment and detachment of the first coil PCB module 310.

Additionally, the first PCB substrate and the first inductive coil may also be replaced by replacing the first coil PCB module 310.

A light receiving unit 311 for receiving a light signal may be installed on the other side of the upper surface of the seating unit 301. The light receiving unit 311 may receive a light signal transmitted from the external, and may transmit the received light signal to the control PCB module 60.

The upper end of the motor assembly 50 may be connected to a blade module 14 located at the lower end of the container body 10, and a cooling fan 55 may be provided on the lower end of the motor assembly 50.

The cooling fan 55 may be configured such that multiple fan blades 552 are radially disposed on the upper surface of a fan plate 551 having a shape of a plate, and during the operation of the motor assembly 50, may rotate simultaneously with the blade module 14 such that cold air introduced in the axial direction of the cooling fan 55 is radially discharged, so the flow of the cold air in the main body 30 may be effectively forced.

Multiple control PCB modules 60 may be disposed on the inner wall surface of the inner casing 32 constituting the inner side surface of the main body 30. The control PCB module 60 may include multiple control PCB modules, and the multiple control PCB modules may be disposed on the circumference of the inner side surface of the main body 30, that is, on the front, rear, left, and right surfaces thereof, respectively.

The control PCB module 60 may include multiple controllers (not shown) capable of controlling the operation of the main body 30 and the container body 10. These controllers may be provided by mounting a MYCOM (a microprocessor) to a PCB substrate in the form of an on-chip, and may include a program and software necessary for controlling the main body 30 and the container body 10.

The container body 10 may be configured as a cylindrical shape corresponding to the outer diameter of the seating part 301, and may have an open upper surface, so the container body may have space therein in which food is received.

The container body 10 may be formed of a transparent material such as glass or materials like glass through which the inner portion of the container body 10 may be seen.

The container body 10 may have the blade module 14 provided at the center of the inner lower surface thereof. The blade module 14 may include multiple blades 141 and may be connected to the motor assembly 50. Accordingly, when the motor assembly 50 operates in a state in which the container body 10 is seated on the main body 30, the blades 141 may rotate and grind or cut food contained inside the container body 10.

Multiple inner guides 121 may be provided in the container body 10 to guide food that is rotated. Each of the inner guides 121 may extend by a predetermined length upward from the lower end of the inner side surface of the container body 10.

Meanwhile, a second coil PCB module 110 may be disposed on a side of the lower end of the container body 10. The second coil PCB module 110 may include a second PCB substrate on which a second inductive coil is patterned by being wound multiple times.

The second coil PCB module 110 may be disposed at a position vertically corresponding to the first coil PCB module 310. Particularly, the first inductive coil and the second inductive coil may be preferably disposed at positions opposite to each other.

The second PCB substrate may be attached to and detached from the container body 10. The attachment and detachment of such a second PCB substrate may be enabled by the attachment and detachment of the second coil PCB module 110.

Furthermore, the second PCB substrate and the second inductive coil may also be replaced by replacing the second coil PCB module 110.

The light emitting unit 112 for transmitting a light signal may be disposed on a second side of the lower end of the container body 10. The light emitting unit 112 may transmit a light signal of a predetermined signal pattern to the outside, and the light receiving unit 311 may receive the light signal of the signal pattern.

A spout 15 through which crushed food is poured may protrude from the upper end of the container body 10, and a handle 13 may be provided at a side facing the spout 15 by protruding therefrom.

The handle 13 may protrude from the upper end of the container body 10 to the outside and then may extend downward such that a user can lift or carry the container body 10. The protruding end portion of the handle 13 may be located on the same extension line as the side end of the main body 30.

A detection module 151 configured to detect the closure of a container lid 20 may be installed on the inner side of the container body 10 to which the handle 13 is coupled. The detection module 151 may be embodied as a PCB substrate, and may include a switch.

The detection module 151 may detect the closure of the container lid 20 in such a manner that the switch provided therein operates according to the closure of the container lid 20, and may determine whether to perform inductive coupling between the first and second coil PCB modules 310 and 110.

That is, when the detection module 151 detects the closure of the container lid 20 on the container body 10, current transmission between the first and second coil PCB modules 310 and 110 may be performed, but when the detection module 151 does not detect the closure of the container lid 20, current transmission between the first and second coil PCB modules 310 and 110 may not be performed.

The detection module 151 and the second coil PCB module 110 may be electrically connected to each other by a conductive member 161. The conductive member 161 may be connected to the detection module 151 in a first end thereof, and may be connected to the second coil PCB module 110 in a second end thereof by extending from the upper end of the container body 10 to the lower end thereof.

The detection module 151 and the second coil PCB module 110 may be provided with first and second connectors 152 and 111, respectively, for effective electrical connection to the conductive member 161. By using the first and second connectors 152 and 111, the detection module 151 and the second coil PCB module 110 may be easily attached to and detached from the conductive member 161. Accordingly, the detection module 151, the second coil PCB module 110, and the conductive member 161 may be more easily attached to and detached from the blender 1, and replacement thereof may also be easy.

The conductive member 161 may be in contact with the inner or outer surface of the container body 10. When being in contact with the outer surface, the conductive member 161 may be coated with a predetermined coating material to be fixedly attached to the outer surface.

The conductive member 161 may be formed of a transparent material such that the design of the container body 10 of the transparent material may be maintained.

The blender 1 according to the embodiment of the present disclosure may include the container lid 20.

The container lid 20 may shield the open upper surface of the container body 10, and a user may open the open upper surface of the container body 10 by separating the container lid 20 from the container body 10.

The open upper surface of the container body 10 may be closed (referred to as the closure of a container lid) or opened (referred to as the opening of the container lid) by the container lid 20 such that the open upper surface of the container body 10 may be closed and opened.

The container lid 20 may include a container lid handle 21.

A triggering member 210 turning on/off the switch of the detection module 151 may be arranged on the inner surface of a side of the container lid 20. When the triggering member 210 approaches the detection module 151 within a predetermined distance, the switch provided in the detection module 151 may be turned on. Contrarily, when the triggering member 210 moves away from the predetermined distance, the switch may be turned off.

Meanwhile, as described above, the blender 1 according to the embodiment of the present disclosure may be operated by the manipulation of the knob 40 and the touch manipulation part 310b, but may be configured to be selectively operated only under a specific condition.

For example, the blender 1 according to the embodiment may be operated only in the state in which the container lid 20 closes the container body 10, that is, in the state of the closure of the container lid. This is because when the blender 1 operates in the open state of the container lid, accidents may occur due to the blades 141, which are sharp, and food contained in the container body 10 may be ejected to the outside.

Figure 4:
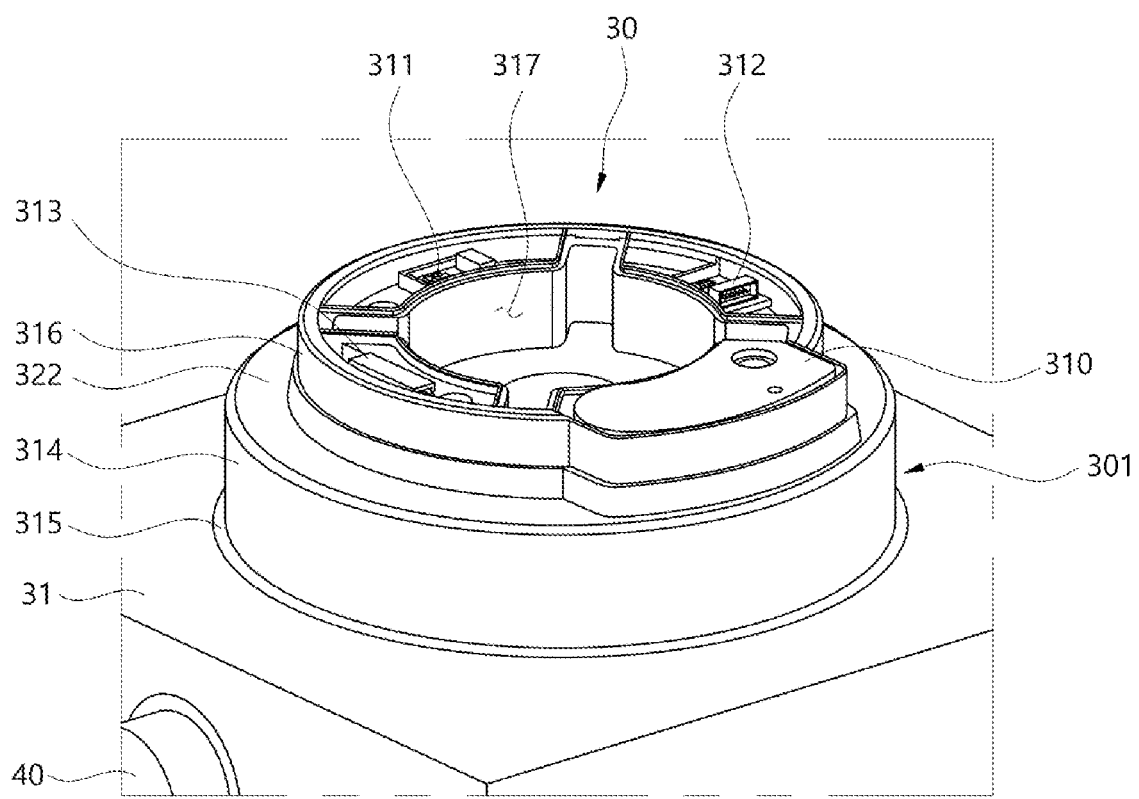
FIG. 4 is a perspective view of a main body which is a component of the blender according to the embodiment of the present disclosure.
Figure 5:
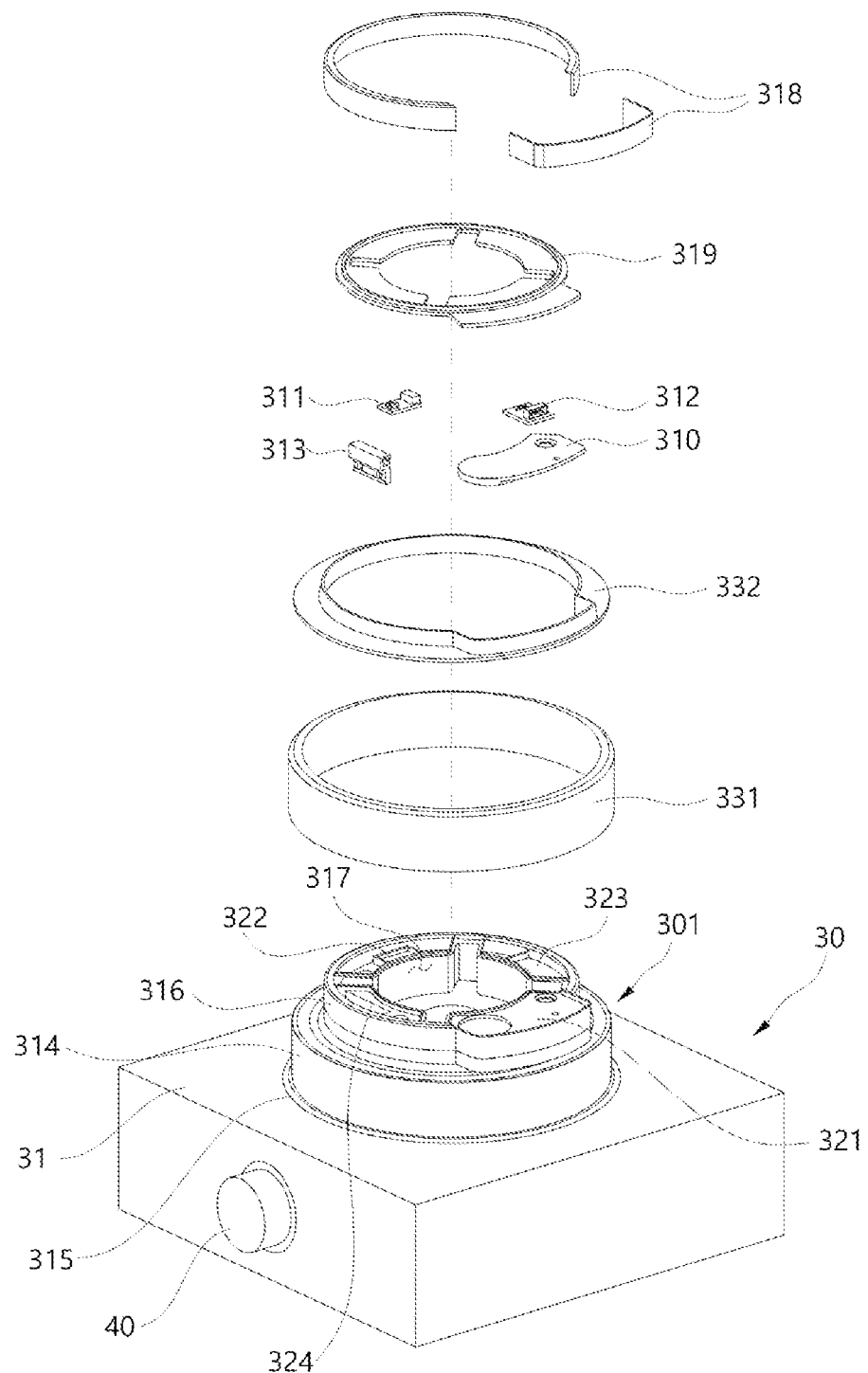
FIG. 5 is an exploded perspective view of the main body.

FIG. 4 is a perspective view of the main body which is a component of the blender according to the embodiment of the present disclosure, and FIG. 5 is an exploded perspective view of the main body.

Referring to the drawings, the main body 30 according to the embodiment of the present disclosure may be configured to have a cuboid shape, and may have a structure in which the seating part 301 protrudes on the upper surface of the main body 30 to seat the container body 10 thereon, and the knob 40 by which the operation of the blender 1 is controlled is disposed on the front surface of the main body 30.

As for the overall structure of the main body 30, the outer casing 31 may be mounted to the outer side of the main body 30 to constitute the exterior of the main body 30. The outer casing 31 may be formed of a metal material such as stainless steel and may be formed of materials having plate shapes, which are bent and joined to each other, thereby providing the shape of a very clean and rigid appearance.

The seating part 301 may have a two-step shape, and an entire appearance thereof may be constituted by a first seating part decoration 314, a second seating part decoration 316, and a lower decoration 315.

The first seating part decoration 314 and the second seating part decoration 316 may be formed of the same material as the outer casing 31 or of a material having the same texture as the outer casing 31.

The lower decoration 315 may be formed of a plastic or rubber material, and may be formed in a ring shape. In addition, during the mounting of the first seating part decoration 314, the lower part 315 may fill space between the first seating part decoration 314 and the outer casing 31 such that no gap is visible.

A first exterior material 331 may be mounted to the circumference of the side surface of the first seating part decoration 314. Such a first exterior material 331 may be formed of a stainless material and may protect the first seating part decoration 314.

The first seating part decoration 314 and the second seating part decoration 316 may have predetermined heights and may be formed in ring shapes as a whole when viewed from the top. The second seating part decoration 316 may have a smaller diameter than the first seating part decoration 314, and may be disposed at the center of the first seating part decoration 314.

A seating packing 332 may be disposed at the outskirt of the second seating part 316 arranged at the center of the upper surface 325 of the first seating part 314. The seating packing 332 is intended to give a sense of stability when the container body 10 is seated on the seating part 301, and may be formed of, for example, a rubber material or a silicone material.

The second seating part decoration 316 may have a circular shape as a whole when seen from the top and may be configured to have a portion protruding laterally.

An insertion space 317 may be defined in the center portion of the upper surface of the second seating part decoration 316, and a first seating groove 321 and a second seating groove 322 may be formed on the circumference of the upper surface of the second seating part decoration 316. A third seating groove 323 and a fourth seating groove 324 may be selectively formed on the upper surface of the second seating part decoration 316.

The first coil PCB module 310 may be seated in the first seating groove 321. The light receiving unit 311 may be seated in the second seating groove 322. A Hall sensor 312 may be selectively seated in the third seating groove 323 so as to detect the type of the container body 10 seated on the main body 30, and a reed switch 313 may be seated in the fourth seating groove 324 so as to detect whether the container body 10 is seated.

The first coil PCB module 310, the light receiving unit 311, the Hall sensor 312, and the reed switch 313 may be attached to and detached from the first, second, third, and fourth seating grooves 321, 322, 323, and 324, respectively When the container body 10 is seated on the main body 30, the Hall sensor 312 may detect a magnet (not shown) attached to the lower part of the container body 10 according to the type of the container body 10 and may detect the type of the container body 10. The magnitude of the magnetic force of a magnet may be different for each type of the container body 10, and accordingly, the type of the container body 10 may be detected by using the magnitude of a magnetic force detected by the Hall sensor 312.

When the container body 10 is seated on the main body 30, the reed switch 313 may detect a magnet (not shown) mounted to the lower part of the container body 10 and may detect whether the container body 10 is seated. When the magnet approaches the reed switch 313, the reed switch 313 may be turned on to detect the approaching of the magnet, and through the detection of the approaching of the magnet, the seating of the container body 10 may be detected.

While the first coil PCB module 310 and the light receiving unit 311 are seated, and while the Hall sensor 312 and the reed switch 313 are selectively seated, a cover 114 may be coupled to the upper part of the second seating part decoration 316.

The cover 114 may hold and protect the first coil PCB module 310, the light receiving unit 311, the Hall sensor 312, and the reed switch 313, and may be formed of a material having a magnetic field penetration function such that the light receiving unit 311 or the Hall sensor 312 can sense light or a magnetic field through the cover 114.

While the cover 114 is coupled to the second seating part decoration 316, a second exterior material 318 may be mounted to the circumference of each of the side surfaces of the cover 114 and the second seating part decoration 316.

Figure 6:
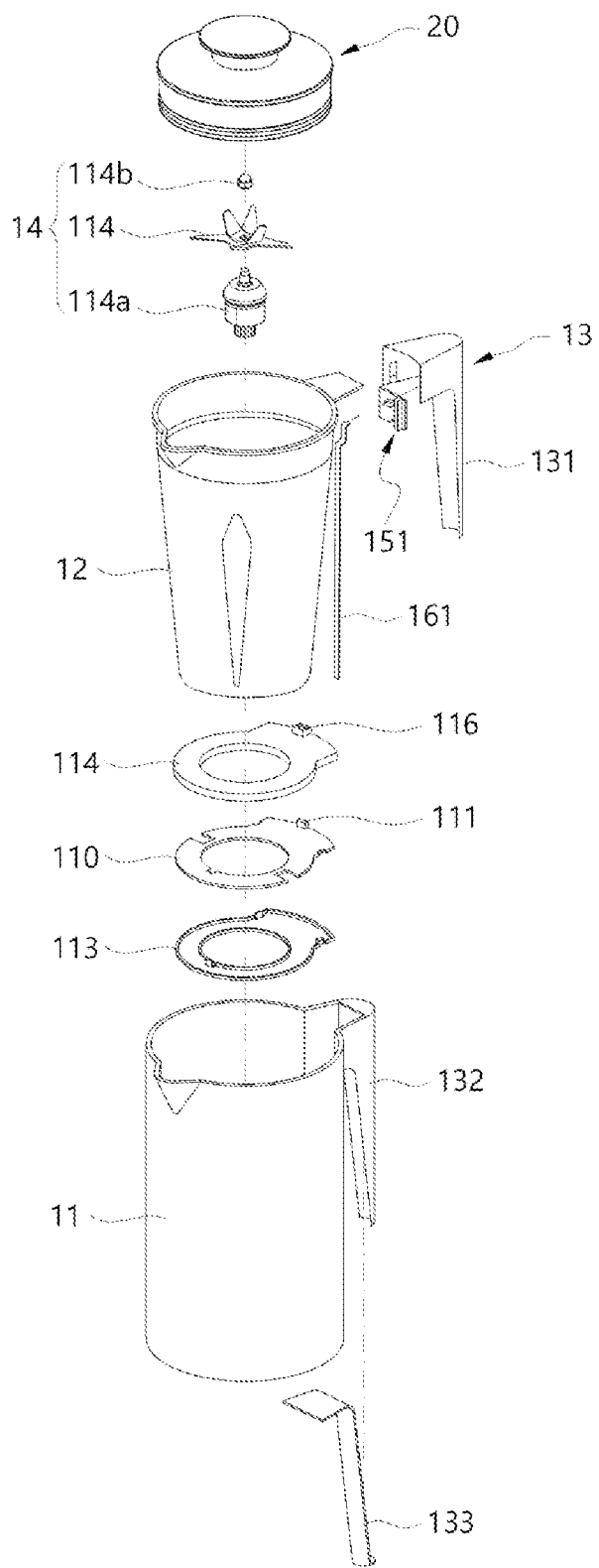
FIG. 6 is an exploded perspective view of a container body which is a component of the blender according to the present disclosure.
Figure 7:
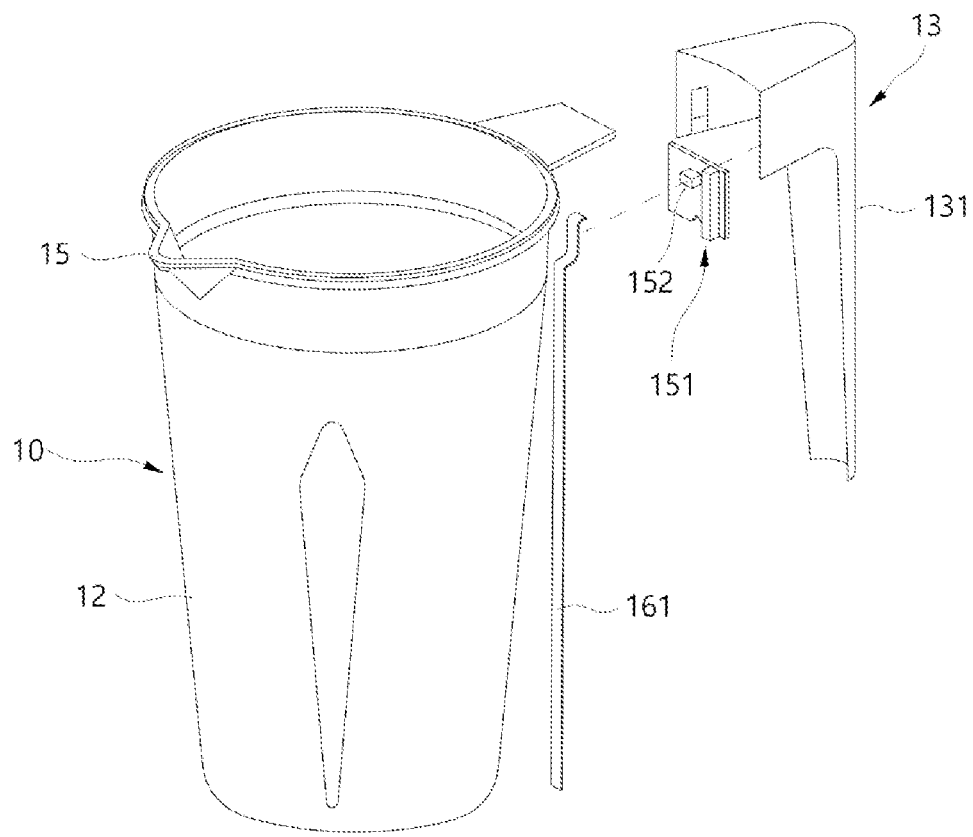
FIG. 7 is a perspective view of an inner container body according to the present disclosure seen at a different angle.
Figure 8:
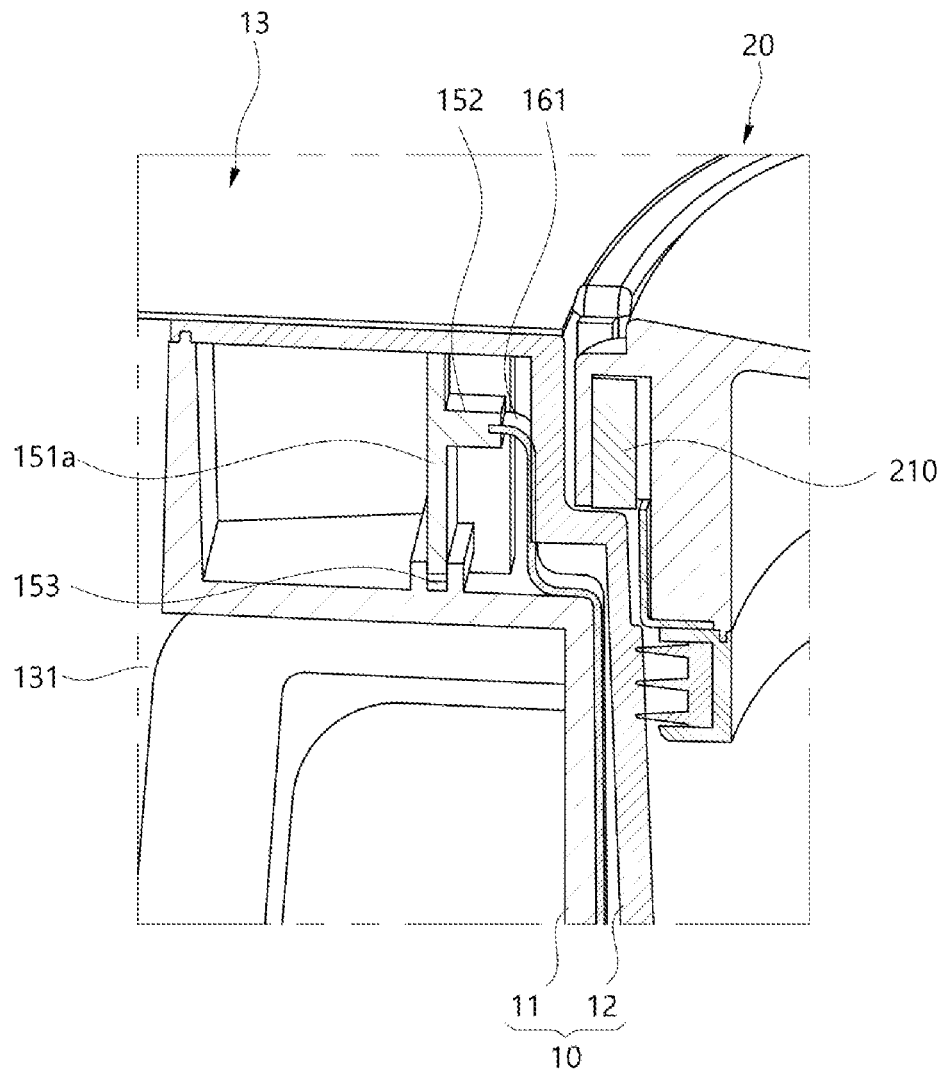
FIG. 8 is a detailed view of a detection module of the container body.
Figure 9:
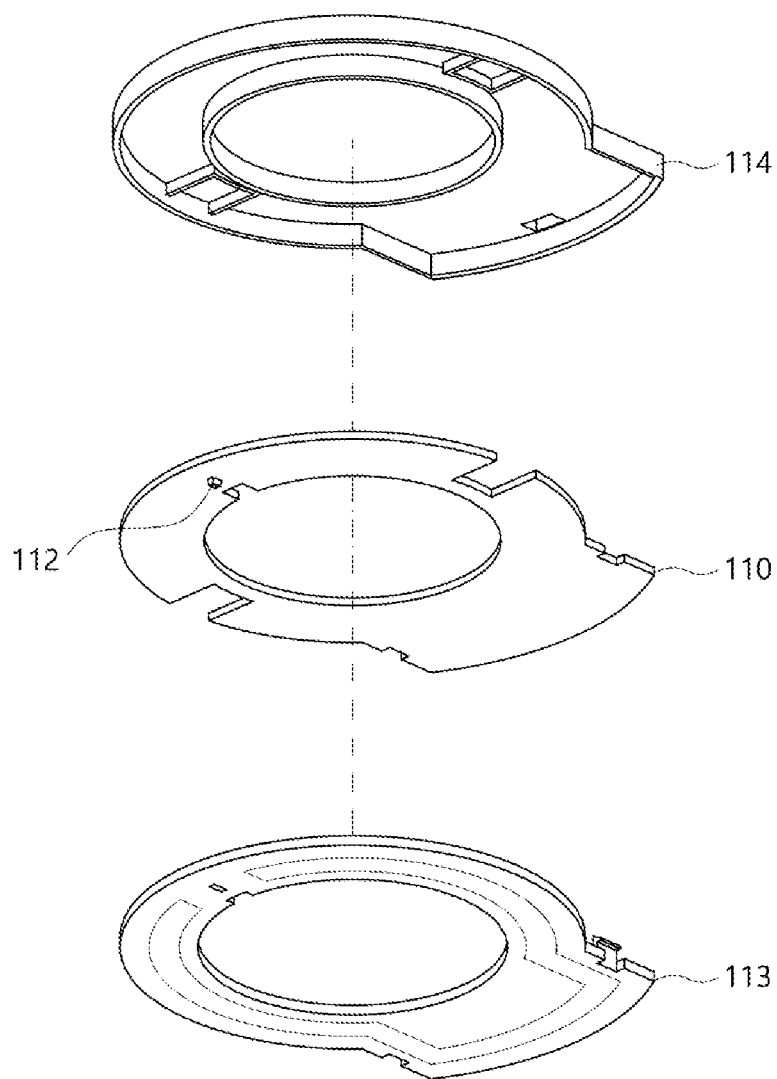
FIG. 9 is an exploded perspective view of a second coil PCB module of the container body seen from a lower side thereof.

FIG. 6 is an exploded perspective view of the container body which is a component of the blender according to the embodiment of the present disclosure, FIG. 7 is a perspective view illustrating the coupled structure of the inner container body and a handle cover seen at a different angle, FIG. 8 is a detailed view of the detection module of the container body, and FIG. 9 is an exploded perspective view of the second coil PCB module of the container body seen from a lower side thereof.

Referring to the drawings, the container body 10 according to the embodiment may be configured in a cylindrical shape having the open upper surface. The blade module 14 may be mounted to the lower surface of the container body 10, and the container lid 20 may be detachably mounted to the open upper surface of the container body 10.

The container body 10 may be formed of a material such as glass, Tritan, or transparent plastic, etc. to check the state of food therein during the operation of the blender 1.

The container body 10 may include the outer container body 11 constituting an outer shape thereof, and the inner container body 12 having inner space in which food is received.

The inner container body 12 and the outer container body 11 may be coupled to each other and may constitute the overall shape of the container body 10 such that the container body 10 has a double wall structure.

The inner container body 12 may be spaced apart from the outer container body 11, which may define space between the outer container body 11 and the inner container body 12. The inner container body 12 may have a diameter decreasing gradually downward. The lower part of the inner container body 12 may be configured to be inclined or round toward the blade module 14 such that food in the container body 10 may be directed to the blade module 14.

The outer container body 11 may have a cylindrical shape having upper and lower ends which have the same outer diameters, respectively, such that the appearance of the container body 10 looks neat.

The outer diameter of the outer container body 11 may be configured to be the same as the outer diameter of the seating part 301, and while the container body 10 is mounted to the main body 30, the main body 30 and the container body 10 may be seen as being integrated with each other.

A receiving part (not shown) of the main body may be formed on the lower surface of the outer container body 11. The receiving part of the main body may have space recessed upward from the lower surface of the outer container body 11 such that the second seating part decoration 316 described above can be inserted into the space. Due to the coupling of the receiving part (not shown) of the main body to the second seating part decoration 316, the state of the container body 10 mounted to the seating part 301 may be maintained.

A middle handle 132 may be formed at a side of the upper end of the outer container body 11 by protruding therefrom. When the middle handle 132 is formed by protruding, an inner space may be defined at the side of the upper end of the outer container body 11 to receive the detection module 151.

An outer handle 131 may be coupled to the outer side of the middle handle 132, and an inner handle 133 may be coupled to the inner side of the middle handle 132 so as to constitute the handle 13 as a whole.

The upper end of the inner container body 12 may be configured to have an inclined surface 122 having an inner diameter decreasing gradually downward. Accordingly, in a process in which the container lid 20 is inserted to the open upper surface of the container body 10, the container lid 20 may be configured to seal the inner container body 12 while being gradually brought into close contact with the inner container body 12.

The upper inclined surface of the inner container body 12 may be configured from the upper end of the container body 10 to the upper end of the inner guide 121, and may be configured along the circumference of the inner surface of the container body 10.

The inner guide 121 may be formed on the inner side surface of the inner container body 12. The inner guide 121 may extend from the inclined surface 122 to the bottom surface of the inner container body 12.

A blade module 14 may be disposed at the inner lower part of the inner container 12, and the blade module 14 may have a plurality of blades 141 inserted into an upper portion of the base 141a and fixed to a nut 141b at an upper part thereof.

The second coil PCB module 110 may be disposed on the lower part of the inner container body 12. As described above, the second coil PCB module 110 may be embodied with the second inductive coil 201 patterned on the PCB substrate. The second inductive coil 201 may be wound multiple times on the PCB substrate in a spiral shape relative to a center point 201a.

The light emitting unit 112 may be disposed at a side of the lower surface of the second coil PCB module 110. The light emitting unit 112 may be electrically connected to a second inductive coil to be described later, and when a voltage is supplied from the second inductive coil, the light emitting unit may transmit a light signal to the outside in a predetermined signal pattern.

The second coil PCB module 110 may be fixedly mounted to a lower plate 113, and while the second coil PCB module 110 is fixedly mounted to the lower plate 113, the cover 114 may be coupled to the lower plate 113.

In addition, the second connector 111 may be installed at a side of the upper surface of the second coil PCB module 110 by protruding therefrom to electrically connect the second inductive coil 201 with the conductive member 161.

A receiving part 116 having an open upper surface may be installed on the upper surface of the cover 114 by protruding therefrom to receive the second connector 111 from a position under the cover 114, and the conductive member 161 may be coupled to the second connector 111 exposed through the receiving part 116 to be electrically connected to the second coil PCB module 110.

The detection module 151 may be installed on the inner side of the upper end portion of the container body 10 to which the handle 13 is coupled. The detection module 151 may be embodied as a PCB and may include a switch which may be turned on/off as described later. Such a switch may be switched on only under a specific condition.

The detection module 151 may detect whether the container lid 20 closes the container body 10. Specifically, when the container lid 20 closes the container body 10, the switch located inside the detection module 151 may be turned on by the triggering member 210 installed inside the container lid 20.

Accordingly, in the embodiment, when the switch in the detection module 151 is turned on, the detection module 151 may detect the closure of the container lid 20.

The detection module 151 may be seated in a groove 153 formed thereunder and may maintain stability thereof. The first connector 152 may be mounted to the detection module 151 such that the detection module 151 is electrically connected with the conductive member 161.

The conductive member 161 may be disposed between the outer container body 11 and the inner container body 12. The conductive member 161 may be disposed by extending in the longitudinal direction of the container body 10 from the upper part of the container body 10 to the lower part thereof.

The conductive member 161 may be formed of a transparent material to secure and maintain the transparency of the outer container body 11 and the inner container body 12 formed of a material such as glass, Tritan, or transparent plastic, etc. In the embodiment, the conductive member 161 may include a transparent electrode film (ITO).

The first end of the conductive member 161 may be electrically connected to the detection module 151 by the first connector 152, and the second end of the conductive member 161 may be electrically connected to the second coil PCB module 110 by the second connector 111. Specifically, the first end of the conductive member 161 may be connected to the switch provided in the detection module 151, and the second end of the conductive member 161 may be connected to the second inductive coil 201 provided in the second coil PCB module 110.

The conductive member 161 may be in contact with the inner surface of the outer container body 11 or with the outer surface of the inner container body 12 and may extend from the upper part of the container body to the lower part thereof.

The upper end part of the conductive member 161 may be installed by bending in a section according to the shapes of the outer container body 11 and the inner container body 12.

The triggering member 210 may be mounted to the inside of a side surface of the container lid 20 such that the triggering member 210 is located at a position corresponding to the detection module 151. When the container lid 20 closes the container body 10, the triggering member 210 may be installed to approach the detection module 151 within a predetermined distance.

When the triggering member 210 approaches the detection module 151 within a predetermined distance, the switch of the detection module 151 may be turned on.

Specifically, when the container lid 20 closes the container body 10, the triggering member 210 installed inside the container lid 20 may approach the detection module 151 within a predetermined distance, and the switch of the detection module 151 may be turned on. Meanwhile, when the container lid 20 is opened, the triggering member 210 of the container lid 20 may move away by a predetermined distance from the detection module 151 and the switch of the detection module 151 may be turned off.

Figure 10:
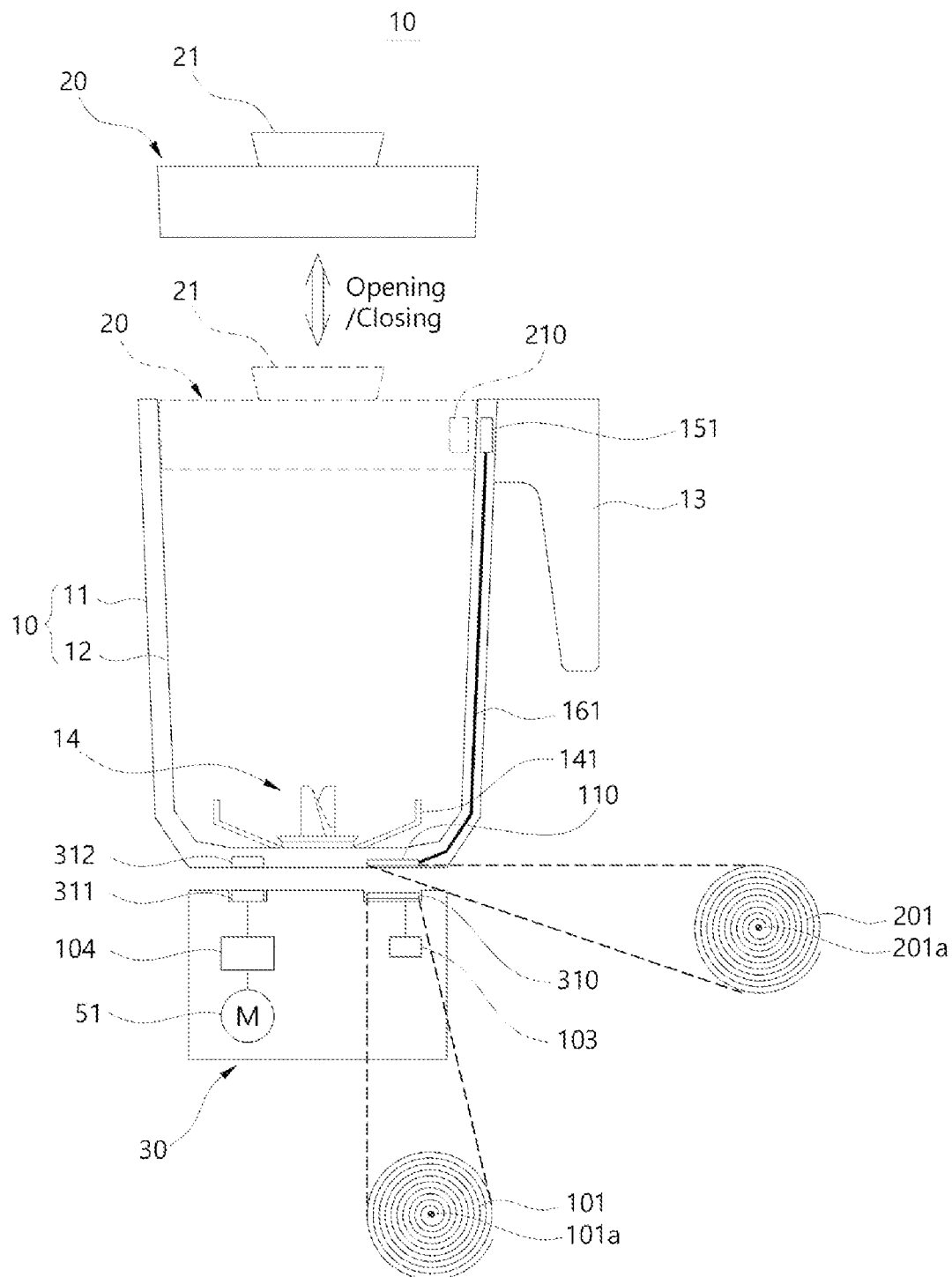
FIG. 10 is a view schematically illustrating the configuration of a portion of the blender according to the embodiment of the present disclosure.
Figure 11:
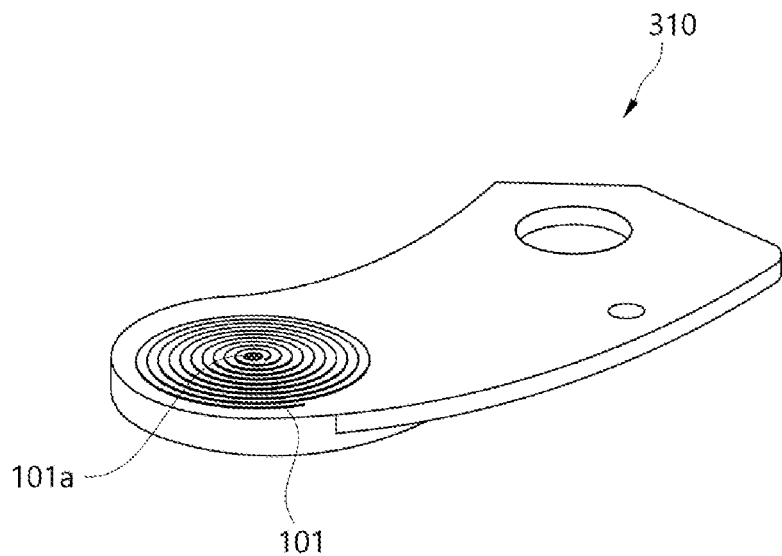
FIG. 11 is a detailed view of the upper surface of a first coil PCB module of the main body.
Figure 12:
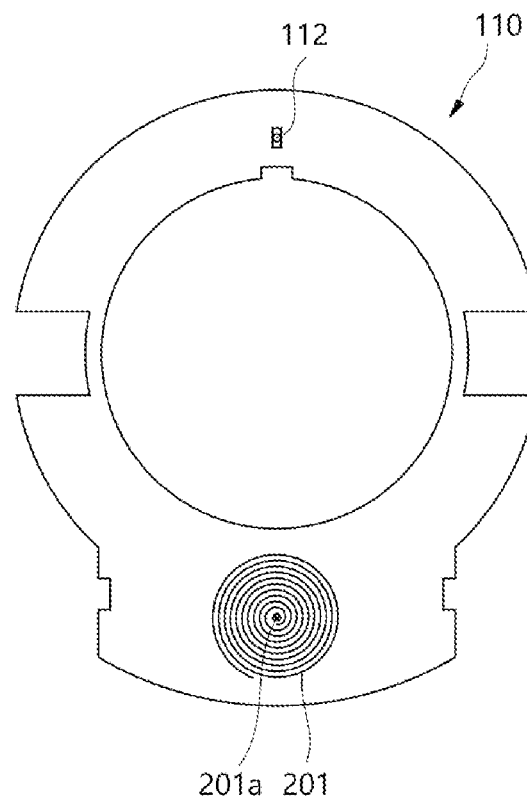
FIG. 12 is a detailed view of the lower surface of the second coil PCB module of the container body.
Figure 13:
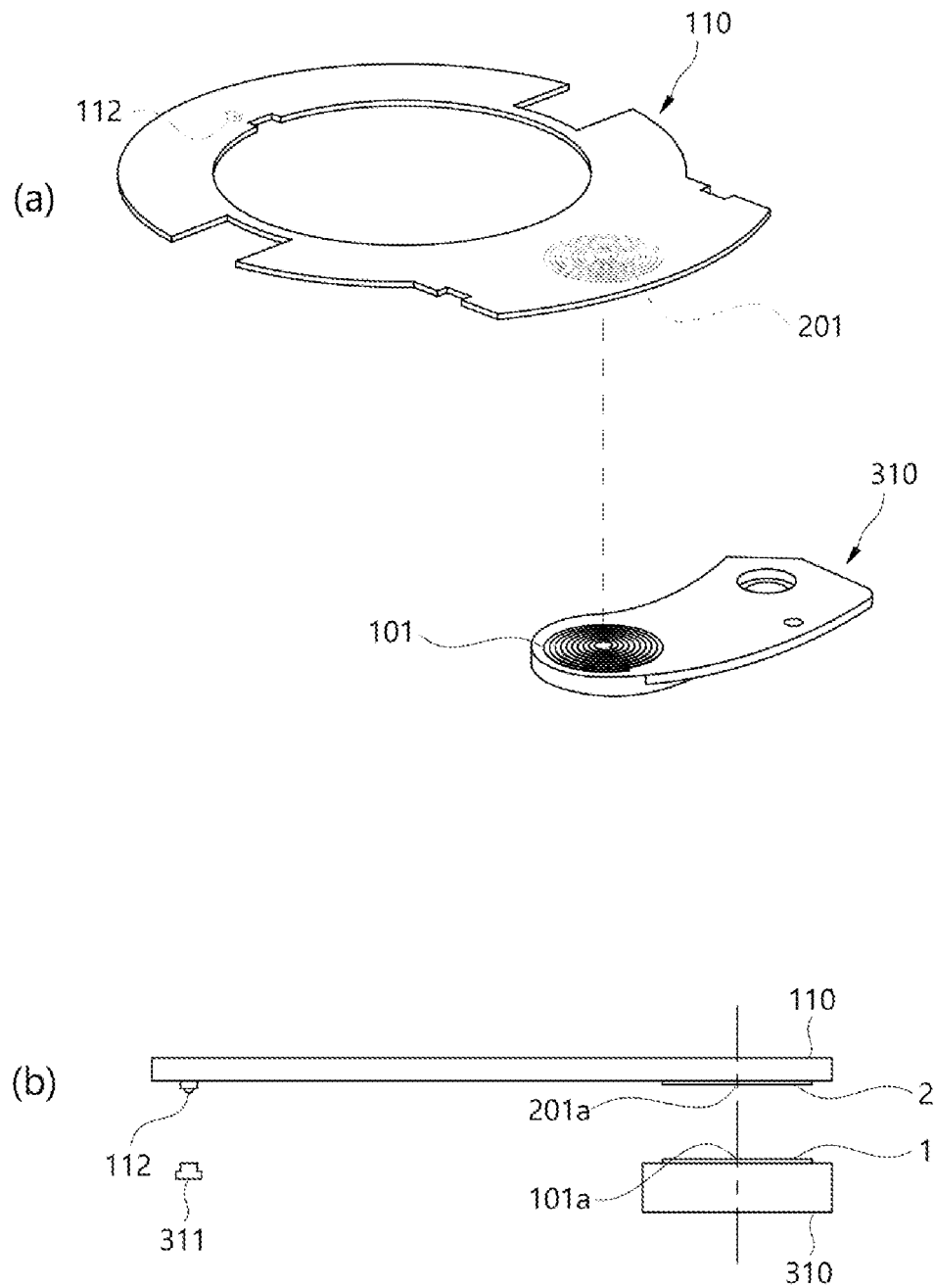
FIG. 13 is a view schematically illustrating arrangement between the first and second coil PCB modules.

FIG. 10 is a partial cross sectional view schematically illustrating the configuration of a portion of the blender according to the embodiment of the present disclosure, FIG. 11 is a detailed view of the upper surface of the first coil PCB module of the main body, FIG. 12 is a detailed view of the lower surface of the second coil PCB module of the container body, and FIG. 13 is a view schematically illustrating arrangement between the first and second coil PCB modules.

Referring to the drawings, the first coil PCB module 310 may be installed at a first side of the upper part of the main body 30 of the blender 1 according to the embodiment of the present disclosure.

The first coil PCB module 310 may be embodied with the first inductive coil 101 patterned on the first PCB module 310. The first inductive coil 101 may be wound multiple times on the PCB substrate in a spiral shape relative to a center point 101a.

The main body 30 may include a power supply unit 103 therein. The power supply part 103 may apply current to the first inductive coil 101. When the current is applied to the first inductive coil 101, a magnetic field may be generated in the first inductive coil 101.

The power supply part 103 may be mounted to the first coil PCB module 310, or to the control PCB module 60.

The power supply part 103 may change the intensity of the current applied to the first inductive coil 101, and the intensity of the magnetic field of the first inductive coil 101 may be changed by the change of the intensity of the current.

The light receiving unit 311 for receiving a light signal transmitted from the light emitting unit 112 may be disposed at a second side of the upper part of the main body 30. In this case, the light receiving unit 311 may be disposed to be exposed to the outside in order to receive the light signal.

The main body 30 may include a controller 104 provided therein. The controller 104 may be connected to the motor assembly 50 described above, and may drive the motor 51 of the motor assembly 50 when a light signal is received from the light receiving unit 311. The controller 104 may be mounted on the control PCB module 60 described above.

The second coil PCB module 110 may be installed at a first side of the lower surface of the container body 10.

The second coil PCB module 110 may be embodied with the second inductive coil 201 patterned on the second PCB substrate. The second inductive coil 201 may be wound multiple times on the PCB substrate in a spiral shape relative to the center point 201a.

Like the embodiment illustrated in the drawing, when the container body 10 is seated on the main body 30, the first inductive coil 101 of the main body 30 and the second inductive coil 201 of the container body 10 may be disposed at a predetermined interval at positions corresponding to each other.

When the container body 10 is seated on the main body 30, the first inductive coil 101 and the second inductive coil 201 may be concentric in the two center points 101a and 201a, respectively, and may be disposed to be parallel to each other by facing each other.

Inductive coupling between the first inductive coil 101 and the second inductive coil 201 may be selectively performed under a specific condition.

When the intensity of current applied to the first inductive coil 101 changes, a magnetic field of the first inductive coil 101 may be changed, and a magnetic flux passing through the second inductive coil 201 may be changed due to the inductive coupling between the first inductive coil 101 and the second inductive coil 201, so an induced electromotive force may be generated in the second inductive coil 201.

The positions and arrangement of the first and second inductive coils 101 and 201 may be determined such that the inductive coupling is effectively performed therebetween.

The light emitting unit 112 for transmitting a light signal to the outside may be disposed at a second side of the lower part of the container body 10. In the embodiment of the present disclosure, the light emitting unit 112 may be installed at one side of the lower surface of the second coil PCB module 110.

The second inductive coil 201 and the light emitting unit 112 of the second coil PCB module 110 may be electrically connected to each other, and the light emitting unit 112 may receive a voltage from the second inductive coil 201 and transmit a light signal. In this case, the transmitted light signal may have a predetermined signal pattern.

When a light signal is transmitted from the light emitting unit 112 of the container body 10, the light receiving unit 311 of the main body 30 may receive the light signal.

The light emitting unit 112 and the light receiving unit 311 may be disposed at positions facing each other so as to smoothly transmit and receive signals.

In this embodiment, the light emitting unit 112 may include, for example, a light source that emits light, and the light receiving unit 311 may include a light sensor that detects the emitted light.

The light source may be, for example, a light emitting diode (LED), in particular an infrared (IR) LED. The light sensor may be implemented as a semiconductor device, a photodiode, or a phototransistor.

The detection module 151 may be mounted to the upper end part of the container body 10. In the embodiment, in the upper end part the container body 10, the detection module 151 may be mounted between the outer container body 11 and the inner container body 12. The detection module 151 may be embodied with the switch 151a to be described later mounted to a PCB substrate.

The triggering member 210 may be mounted on a side of the side surface of the container lid 20. When the container lid 20 closes the container body 10, the triggering member 210 may be disposed to approach the detection module 151 located substantially at the same height as the triggering member 210 within a predetermined distance.

When the container lid 20 closes the container body 10, the triggering member 210 of the container lid 20 may approach the detection module 151 within a predetermined distance, and the switch 151a of the detection module 151 may be turned on. Accordingly, the detection module 151 may function to detect the closure of the container lid.

In the embodiment, the triggering member 210 may be a magnetic body, and the switch 151a may be a reed switch.

In the embodiment, the reed switch may be turned off in an initial stage, and when the magnetic body approaches the reed switch within a predetermined distance, the reed switch may be turned on.

The detection module 151 and the second coil PCB module 110 may be electrically connected to each other through the transparent conductive member 161. Specifically, the transparent conductive member 161 may electrically connect the switch 151a of the detection module 151 with the second inductive coil 201 of the second coil PCB module 110.

In the embodiment, the conductive member 161 may include a transparent electrode film (ITO). The transparent electrode film ITO may be a transparent material capable of conducting an electrical current.

The transparent electrode film (ITO) may be installed at various positions. According to the embodiment, the transparent electrode film may be installed between the outer container body 11 and the inner container body 12. The transparent electrode film may be preferably attached to the inner surface of the outer container body 11 or on the outer surface of the inner container body 12.

For another example, the transparent electrode film (ITO) may be attached to the outer surface of the outer container body 11, and in this case, the transparent electrode film (ITO) may be coated with a transparent coating material such that the transparent electrode film is protected from the outside.

The transparent electrode film (ITO) may be disposed in the longitudinal direction of the container body 10 from the detection module 151 of the upper part of the container body 10 to the second coil PCB module 110 of the lower part of the container body 10. Accordingly, although the transparent electrode film (ITO) is disposed in the vertical longitudinal direction of the container body 10, the transparency of the container body 10 may be maintained.

Meanwhile, the second inductive coil 201, the switch 151a and the light emitting unit 12 may be electrically connected in series to each other. Accordingly, according to the turn on/off of the switch 151a, power from the second inductive coil 201 to the light emitting unit 112 may be supplied and interrupted.

The container 10 may include a driving unit 204 that supplies a voltage from the second inductive coil 201 to the light emitting unit 112 and controls the light emitting unit 112. The driving unit 204 may be mounted on the second coil PCB module 110.

The light emitting unit 112 may output a light signal according to an input signal pattern. Such a signal pattern may be generated by the driving unit 204 and transmitted to the light emitting unit 112.

In the embodiment, the driving unit 204 may convert an AC voltage generated by the second inductive coil 201 into a DC voltage required by the light emitting unit 112 and supply the DC voltage.

Figure 14:
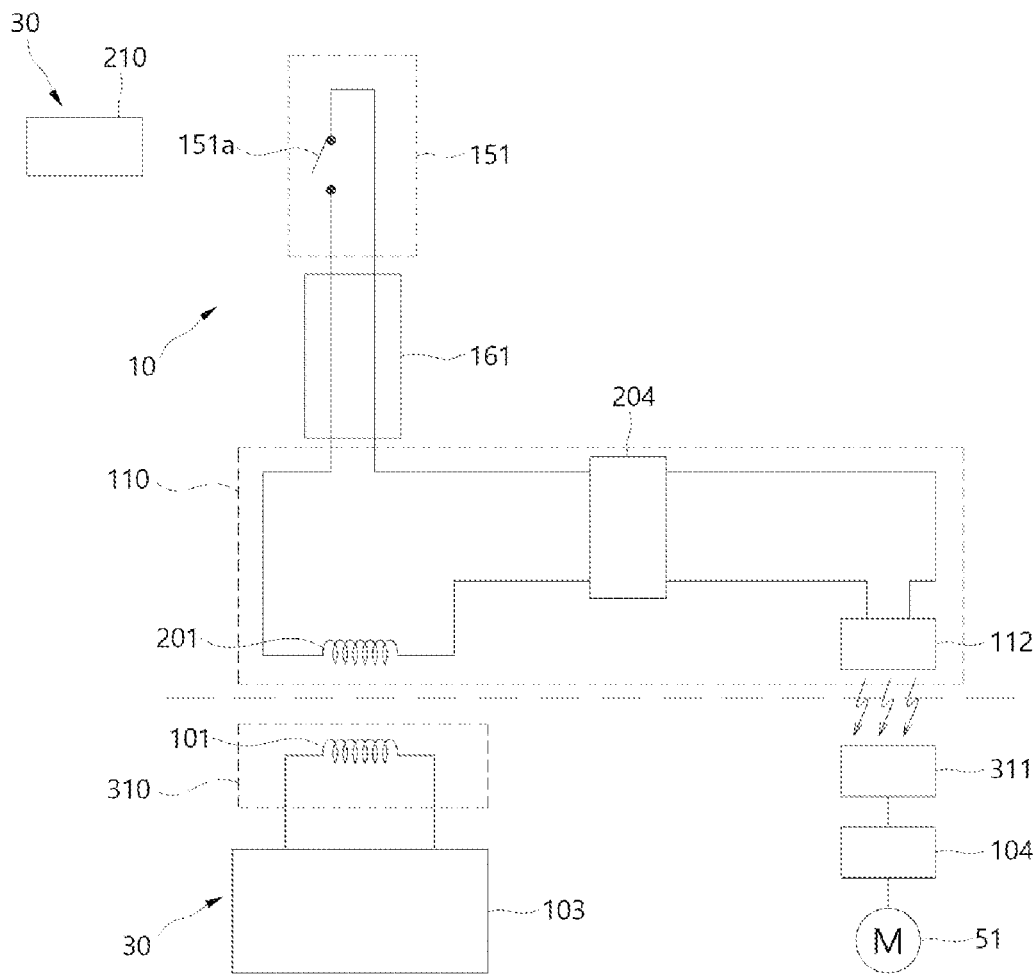
FIG. 14 is a view illustrating an example of an equivalent circuit diagram of the blender.
Figure 15:
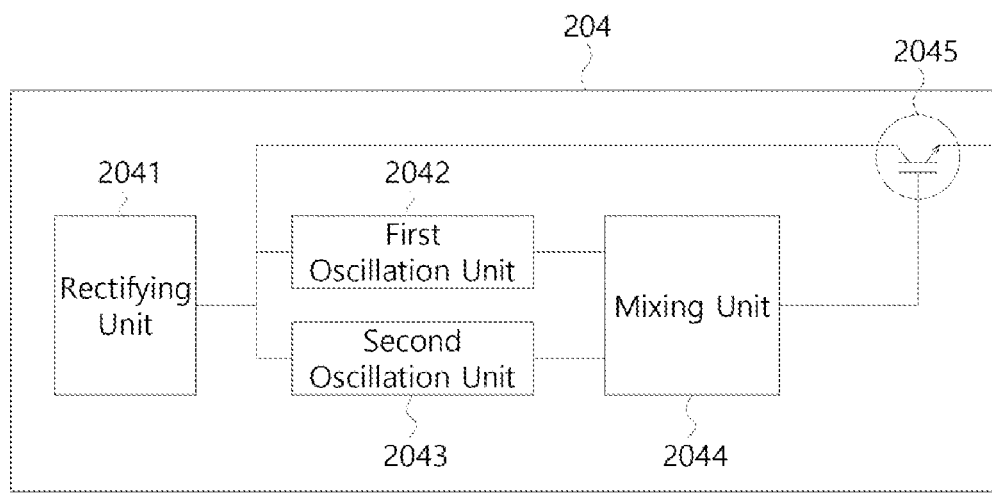
FIG. 15 is a configuration diagram of a driving unit according to an embodiment of the present disclosure.
Figure 16:
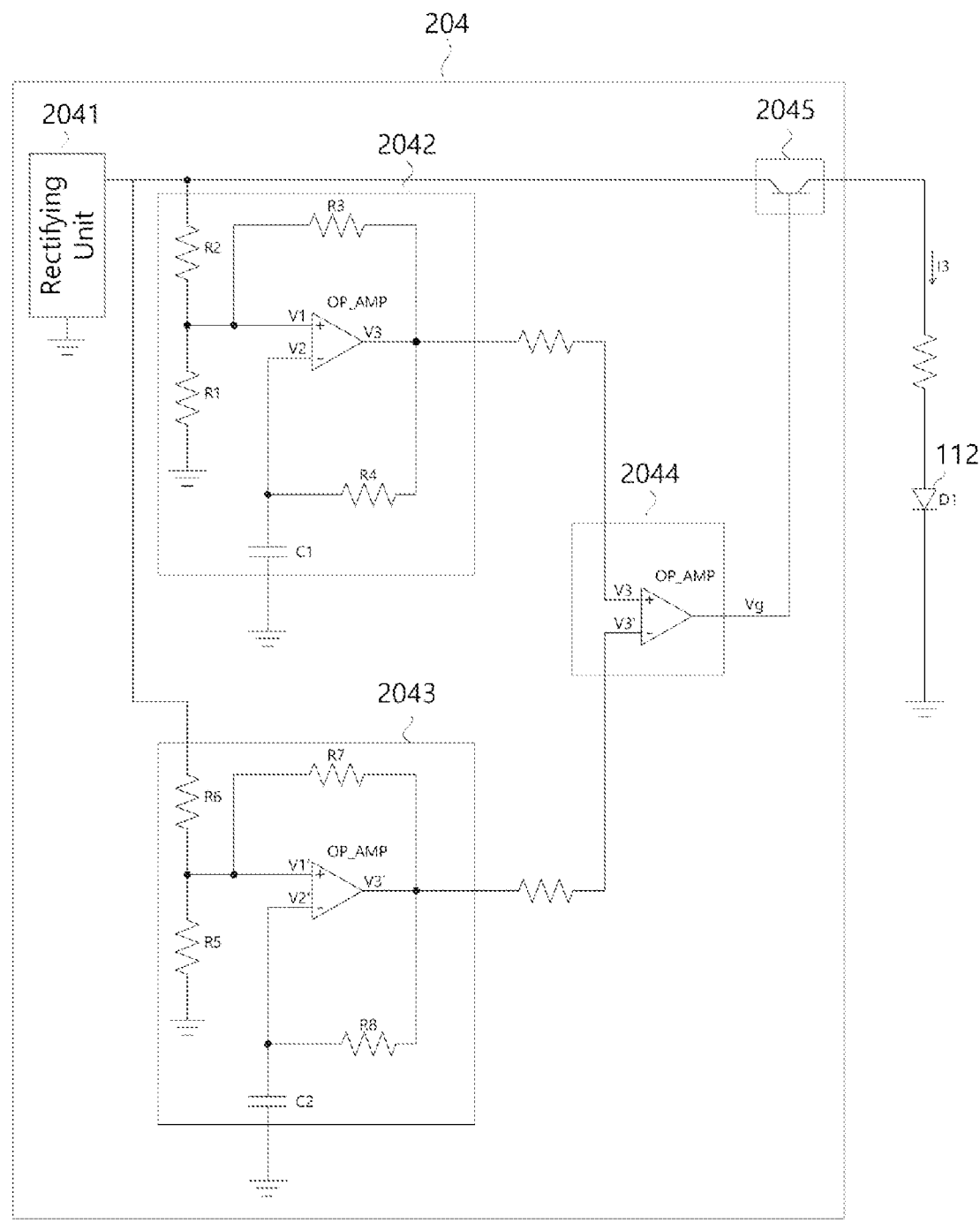
FIG. 16 is a detailed configuration diagram of a driving unit according to an embodiment of the present disclosure.

FIG. 14 is a view illustrating an equivalent circuit diagram of a blender according to the embodiment of the present disclosure. FIG. 15 is a configuration diagram of a driving unit, and FIG. 16 is a detailed configuration diagram of the driving unit according to the embodiment of the present disclosure.

Referring to the drawings, in the main body 30, the first inductive coil 101 may be connected to the power supply part 103, and the light receiving unit 311 may be connected to the controller 104 and the motor 51.

The power supply part 103 may supply a current to the first inductive coil 101 and a magnetic field may be generated by the current supplied to the first inductive coil 101.

By adjusting the intensity of the current supplied from the power supply part 103 to the first inductive coil 101, a change of the magnetic field of the first inductive coil 101 may be induced In the container body 10, the second inductive coil 201 may be connected to the detection module 151 and the light emitting unit 112. In the present embodiment, for example, the second inductive coil 201 may be selectively connected to the light emitting unit 112 and the detection module 151 through the driving unit 204.

In this case, in the present embodiment, the connection between the second inductive coil 201 and the detection module 151 may use the conductive member 161 made of a transparent material.

The detection module 151 may include a switch 151a. In this embodiment, the switch 151a may include a reed switch.

The switch 151a may be connected to the light emitting unit 112 through the driving unit 204. When the voltage is applied from the second inductive coil 201, the light emitting unit 112 may transmit a light signal according to a signal pattern output from the driving unit 204. That is, the light signal may be transmitted in the signal pattern.

The operation of the blender will be described with reference to such an equivalent circuit diagram.

In a state in which the container lid 20 does not close the container body 10, the detection module 151 may not detect the triggering member 210, so the turn-off state of the switch 151a may be maintained.

In a state in which the switch 151a is turned off, the second inductive coil 201, the switch 151a, and the light emitting unit 112 may not form a closed circuit, so inductive coupling between the first inductive coil 101 and the second inductive coil 201 may not occur.

When the container lid 20 closes the container body 10, the triggering member 210 may approach the detection module 151 within a predetermined distance, and the switch 151a of the detection module 151 may be turned on by the triggering member 210.

When the switch 151a is turned on, the second inductive coil 201, the switch 151a, and the light emitting unit 112 connected in series may form a closed circuit.

Accordingly, when the closed circuit is formed, inductive coupling between the first inductive coil 101 and the second inductive coil 201 may be performed, and the voltage induced in the second inductive coil 201 may be supplied to the light emitting unit 201.

In this case, the light emitting unit 112 may transmit the light signal according to the signal pattern output from the driving unit 204. That is, the light emitting unit 112 may output the light signal in the signal pattern by performing on/off according to the signal pattern output from the driving unit 204.

When the light signal having the signal pattern is transmitted from the light emitting unit 112, the light receiving unit 311 may receive the light signal of the signal pattern. When the light receiving unit 311 receives the light signal of the signal pattern, the light receiving unit 311 may transmit the light signal of the signal pattern to the controller 104.

The controller 104 may detect the closure of the container lid by receiving such a light signal, and may drive the motor 51 only when detecting the closure of the container lid.

As described above, in the present embodiment, in the open state of the container lid, the light emitting unit 112 may not transmit the light signal. Accordingly, the light receiving unit 311 cannot receive the light signal, and the controller 104 may not drive the motor 51. Meanwhile, the light emitting unit 112 may transmit the light signal only in the state of the closure of the container lid, and when the light receiving unit 311 receives the light signal, the controller 104 may drive the motor 51.

Referring to FIG. 15, the driving unit 204, according to an embodiment, may include a rectifying unit 2041, a first oscillation unit 2042, a second oscillation unit 2043, a mixing unit 2044, and a switching unit 2045.

The rectifying unit 2041 may convert an AC voltage induced in the second inductive coil 201 into a DC voltage. The DC voltage is supplied to the first oscillation unit 2042, the second oscillation unit 2043, and the switching unit 2045.

The first oscillation unit 2042 may generate and output a first signal having a first frequency by using the supplied DC voltage, and the second oscillation unit 2043 may generate and output a second signal having a second frequency different from the first frequency by using the supplied DC voltage. The first and second signals may be electrical signals.

In the present embodiment, the first and second oscillation units may include, for example, an oscillator.

Meanwhile, in another embodiment of the present disclosure, the second signal of the second frequency generated by the second oscillation unit 2043 may be a unique frequency signal preset by a user.

Such a signal may be a unique frequency signal preset by a user so that the light signal transmitted from the light emitting unit 112 may be distinguished from other external light signals.

In this embodiment, the first frequency may be 30~45 kHz and the second frequency may be 0.5~5 kHz. Of course, these frequencies are examples and are subject to change.

The mixing unit 2044 may output a signal having a predetermined signal pattern by mixing the first signal of the first frequency and the second signal of the second frequency. Such a signal pattern appears according to a constant pattern of on/off.

In the present embodiment, the mixing unit 2044 may be implemented as a logic element, for example, an AND gate. When the mixing unit 2044 is an AND gate, if the first signal and the second signal are all turned on (logic high), a signal is output. When either one of the first and second signals is turned off (logic low), no signal is output. Accordingly, the mixing unit 2044 may output a signal of a new signal pattern in which the first and second signals are mixed and on/off appears in a constant pattern.

The new signal pattern may be input to the switching unit 2045. The switching unit 2045 is preferably a semiconductor switch element, and may be implemented by, for example, an IGBT, a MOSFET, or the like.

The signal pattern may be input as a gate signal of the switching unit 2045. Accordingly, the switching unit 2045 performs on/off in response to the signal pattern input as the gate signal, so that the DC voltage rectified by the rectifying unit 2041 may be output as the new signal pattern.

The output of the switching unit 2045 may be applied to the light emitting unit 112. The light emitting unit 112 may also emit light in the signal pattern.

In the present embodiment, the signal pattern of the light signal emitted by the light emitting unit 112 may be a signal pattern newly generated by mixing a first signal having a first frequency and a second signal having a second frequency set by a user.

This is to prevent the motor 51 of the main body 30 from operating by receiving a light signal received from a light source other than the light emitting unit 112.

That is, by mixing the signal of the unique second frequency preset by the user with the first signal of the first frequency, it is possible to distinguish it from other external light signals.

Meanwhile, the driving unit 204 according to another embodiment of the present disclosure may receive a second signal of a second frequency from the outside without the second oscillation unit 2042.

To this end, the driving unit 204 according to another embodiment may include a signal receiving unit (not shown) for receiving the second signal from the outside instead of the second oscillation unit 2042.

In this case, when the signal receiving unit receives a second signal from the outside, the mixing unit 2044 may output a new signal pattern by mixing the first signal generated by the first oscillation unit 2042 with the second signal received from the outside.

For example, the second signal of the second frequency may be transmitted to the signal receiving unit (not shown) of the driving unit 204 by using a separate remote controller (not shown) capable of outputting a second signal of a second frequency. This is to provide a second signal having a second frequency from the outside, not to be generated in the driving unit 204.

FIG. 16 is a detailed circuit diagram of the driving unit 204 according to an embodiment of the present disclosure. The voltage rectified by the rectifying unit 2041 may be supplied to the first oscillation unit 2042 and the second oscillation unit 2043.

As shown in FIG. 16, the first oscillation unit 2042 and the second oscillation unit 2043 may be composed of the same device, and for convenience, the first oscillation unit (2042) will be described.

However, the first and second oscillation units 2042, 2043 may have different resistance values of resistors (R4 and R8) for adjusting the time constant to generate signals of different frequencies, respectively, as illustrated.

The voltage input from the rectifying unit 2041 may be input to the (+) terminal of the OP-Amp, and the output voltage of the OP-Amp may be fed back to the (−) terminal through the R4 resistor to be input.

In this case, the time constant may be changed according to a resistance value of the R4 resistor, and a power voltage of the OP-Amp may be determined by adjusting the time constant, and in particular, a frequency of the output voltage may be determined.

Of course, in the same way, the time constant may be changed according to the resistance value of the R8 resistor in the second oscillation unit 2043, and the frequency of the output voltage may be determined by adjusting the time constant.

In the OP-Amp, if the voltage (V1) of the (+) terminal is greater than the voltage (V2) of the (−) terminal, the voltage (V3) is output. On the contrary, if the voltage V1 of the (+) terminal is less than the voltage V2 of the (−) terminal, the voltage is not output. That is, the output voltage may be 0 V.

In this case, the V3 voltage and the 0V voltage of the output power voltage may be alternately output depending on the resistance value of the R4 resistor, which determines the frequency of the output power voltage.

In the drawing, for example, the first oscillation unit 2042 illustrates a circuit that outputs a voltage signal of 38 kHz frequency, and the second oscillation unit 2043 illustrates a circuit that outputs a voltage signal of 1 kHz frequency. Of course, this is only an example, and the frequency of the voltage signal may be changed according to the change of the time constant by adjusting the resistors R4 and R8.

These two voltage signals V3 and V3' may be input to the (+) terminal and the (−) terminal of the mixing unit 2044. In the present embodiment, the mixing unit 2044 may be implemented as an AND gate.

The AND gate may mix the first and second voltage signals to output a voltage signal that is turned on/off according to a new signal pattern.

The output signal of the AND gate may be input to the gate terminal of the switching unit 2045.

The switching unit 2045 may be turned on when the output of the AND gate is logic high, and may be turned off when the output of the AND gate is logic low.

When the switching unit 2045 is turned on, the DC voltage rectified by the rectifying unit 2041 may be output and supplied to the light emitting unit 112, and when the switching unit 2045 is turned off, no voltage is output.

As described above, the AND gate may output a voltage Vg of a predetermined signal pattern by mixing the first and second signals of different frequencies. In addition, the switching unit 2045 may be turned on/off according to the voltage Vg of the signal pattern output from the AND gate to supply a DC voltage having the signal pattern to the light emitting unit 112.

Accordingly, the light emitting unit 112 may emit the light signal according to the signal pattern.

In another embodiment, the driving unit 204 may further include a linear and low-dropout (LDO) unit at an output terminal of the rectifying unit 2041.

The LDO unit is provided for stabilizing the output when the DC voltage output from the rectifying unit 2041 is unstable due to various factors, thereby supplying a stable voltage to the light emitting unit 112.

In this embodiment, the LDO unit may control the output voltage so that the actual output value of the DC voltage follows the preset reference output value.

Figure 17:
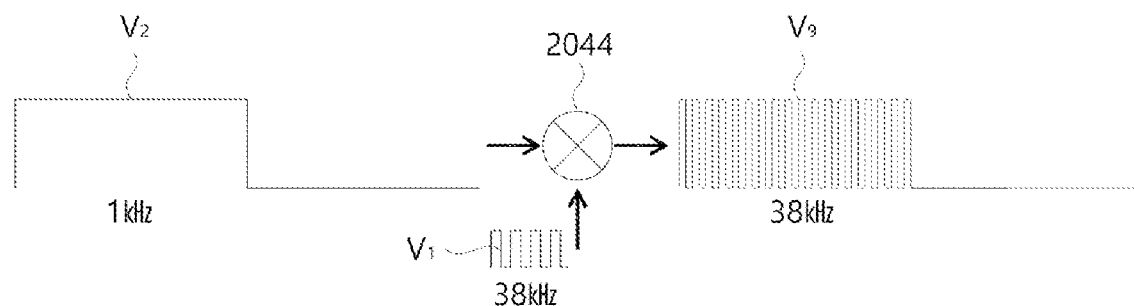
FIG. 17 is a view for explaining an example of mixing two signals in the driving unit according to an embodiment of the present disclosure.
Figure 18:
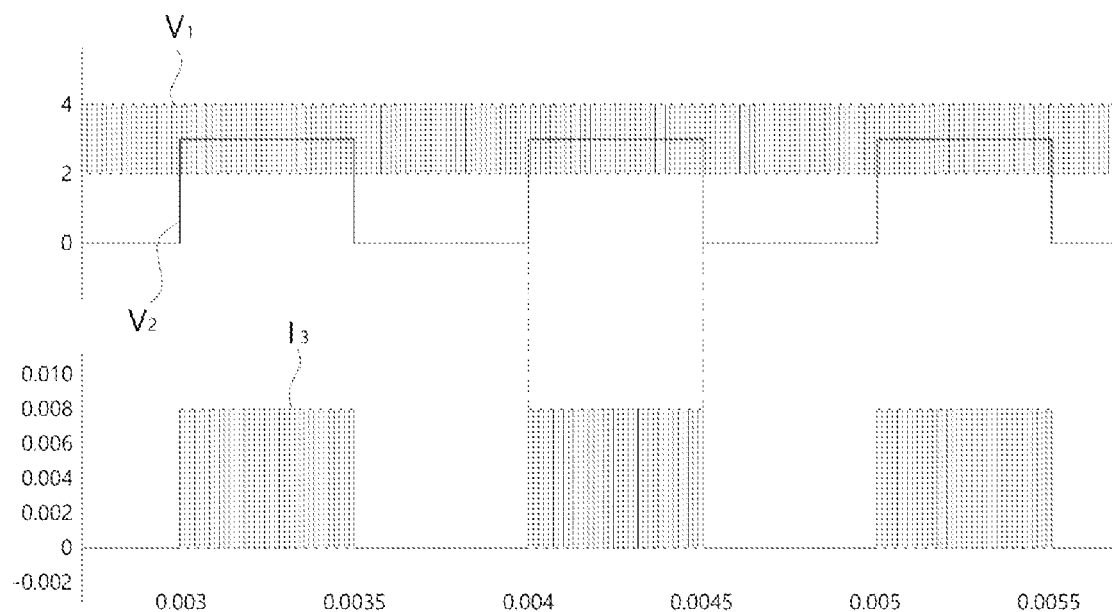
FIG. 18 is an exemplary diagram of mixing signals of first and second frequencies and applying an output current to a light emitting unit after mixing according to an embodiment of the present disclosure.

FIG. 17 is a view illustrating an example in which two signals are mixed in the driving unit according to an embodiment of the present disclosure, and FIG. 18 is an exemplary view of mixing first and second frequency signals and the current applied to the light emitting unit after the mixing.

Referring to FIGS. 17 and 18, an example in which the first frequency is 38 kHz and the second frequency is 1 kHz will be described as an embodiment of the present disclosure.

After the first signal of 38 kHz and the second signal of 1 kHz are input to the mixing unit 2044, when the second signal of 1 kHz is logic high, the first signal of 38 kHz is output, when the second signal of 1 kHz is logic low, no signal is output.

In this case, the second signal of 1 kHz may be a unique pattern set by the user, and the frequency thereof may be changed. In this way, by adding and mixing the signal of a unique pattern by the user, it is possible to distinguish the signal from other external light signals.

Referring to FIG. 18, in an example, when the first signal V1 of the first frequency is 38 kHz and the second signal V2 of the second frequency is 1 kHz, as described above, when the second signal V2 is logic high, the first signal V1 may be output, and when the second signal V2 is logic low, the signal may not be output. Through such a process, a new signal pattern may be output.

When a voltage having the new signal pattern is supplied to the light emitting unit 112, the current 13 flowing to the light emitting unit 112 may also have the signal pattern. Accordingly, the light emitting unit 112 may output a light signal according to the signal pattern.

Figure 19:
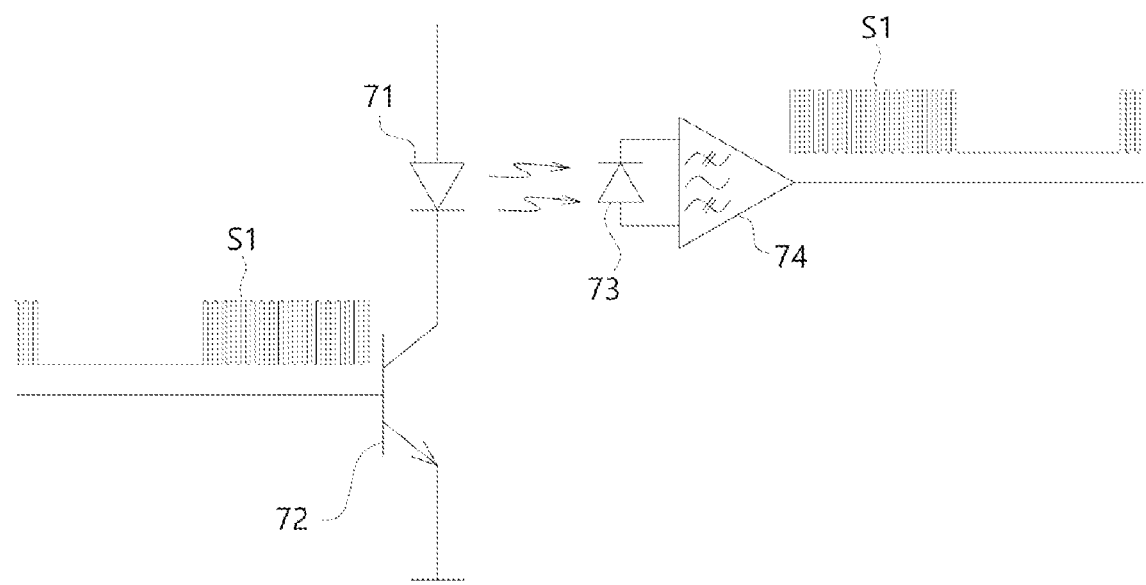
FIG. 19 is a diagram illustrating an example of transmission of a light signal between the light emitting unit and a light receiving unit according to an embodiment of the present disclosure.

FIG. 19 is an exemplary diagram illustrating transmission and reception of a light signal between the light emitting unit and the light receiving unit according to an embodiment of the present disclosure.

Referring to FIG. 19, in the present disclosure, the light emitting unit 112 may include a light emitting diode 71 and a transistor 72, and the light receiving unit 311 may include a photodiode 73 and an amplifier 74.

When the first and second signals are mixed and the current signal 13 of the new signal pattern is input to the gate terminal of the transistor 72, the transistor 72 may turn on/off the light emitting diode 71 according to the current signal of the signal pattern. Accordingly, the light emitting diode 71 may transmit a light signal by performing on/off according to the signal pattern.

When the light signal is transmitted to the photodiode 73 of the light receiving unit 311, an electrical signal is generated, and the electrical signal may be output through the amplifier 74.

In this case, the electrical signal output from the amplifier 74 may correspond to the signal pattern. When the signal pattern is received by the light receiving unit 311 as described above, the controller 104 may analyze the signal to detect the closure of the container lid of the container body 10.

Figure 20:
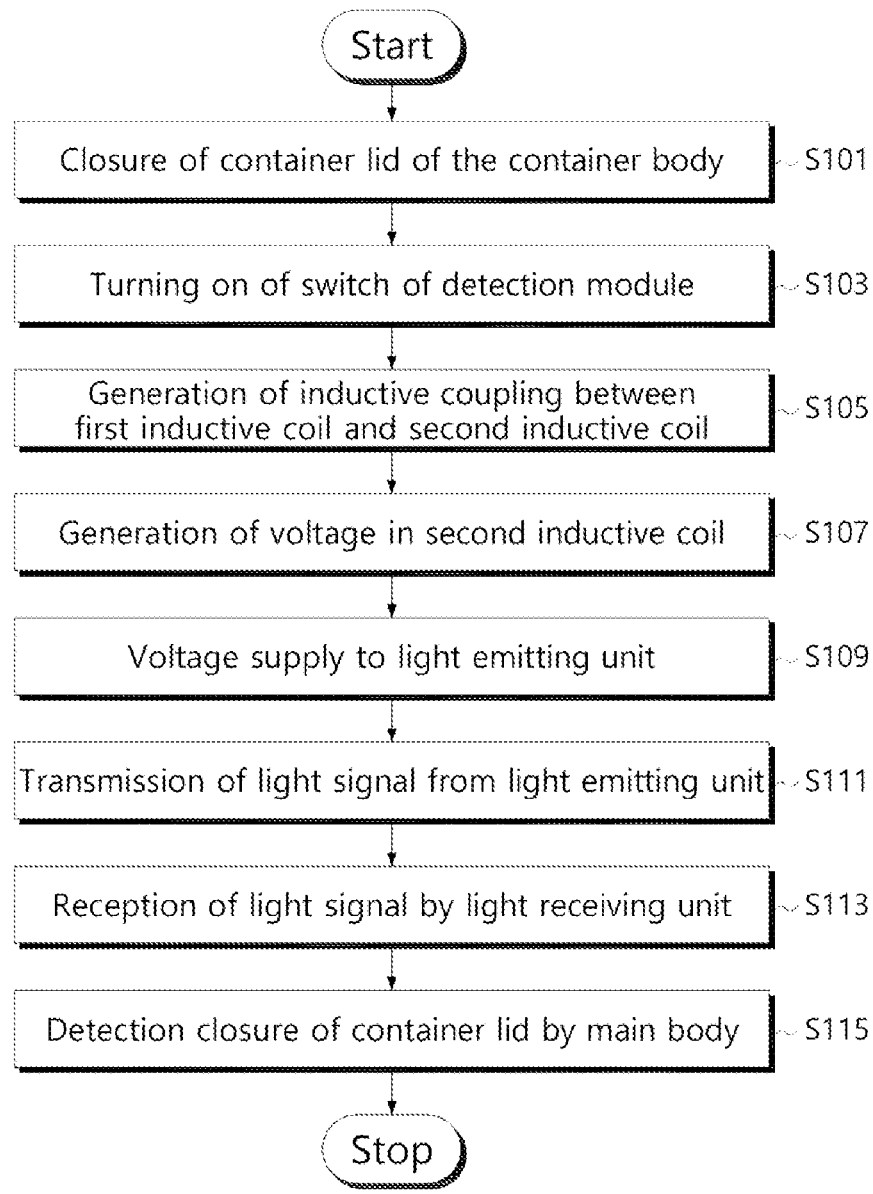
FIG. 20 is a flowchart illustrating a process in which the main body detects the closure of a container lid according to the embodiment of the present disclosure.

FIG. 20 is a flowchart illustrating a process of detecting the closure of container lid closing in the main body according to an embodiment of the present disclosure.

Referring to FIG. 20, in the present disclosure, when the container lid 20 closes the container body 10 at S101, the switch 151a of the detection module 151 may be switched to an on state by the triggering member 210 installed inside one side surface of the container lid 20 at S103.

When the switch 151a is turned on, the switch 151a, the second inductive coil 201, and the light emitting unit 112 may form a closed circuit to cause inductive coupling between the first inductive coil 101 and the second inductive coil 201 at S105.

A voltage may be generated in the second inductive coil 201 by the inductive coupling at S107, and the generated voltage may be supplied to the light emitting unit 112 at S109.

The light emitting unit 202 may transmit a light signal using the supplied voltage at S111, and the light receiving unit 311 may receive the light signal at S113.

When the light signal is received from the light receiving unit 311 as described above, the controller 104 of the main body 30 may detect the closure of the container lid of the container body 10 at S115.

In the present disclosure, the motor 51 may be driven only when the closure of the container lid is detected. Conversely, when the closure of the container lid is not detected, the motor 51 is not driven.

Accordingly, when the light emitting unit 112 and the light receiving unit 311 transmit and receive the light signal due to the closure of the container lid while the container body 10 is seated on the main body 30, the motor 51 may be driven by a user's operation.

In another embodiment, the seating order of the container body 10 on the main body 30 may be changed. That is, when the container body 10 is seated on the main body 30 in a state in which the container lid closes the container body in advance, wireless power transmission occurs, and the light emitting unit 112 and the light receiving unit 311 transmit and receive the light signal. In this state, the motor 51 may be driven by a user's operation.

Figure 21:
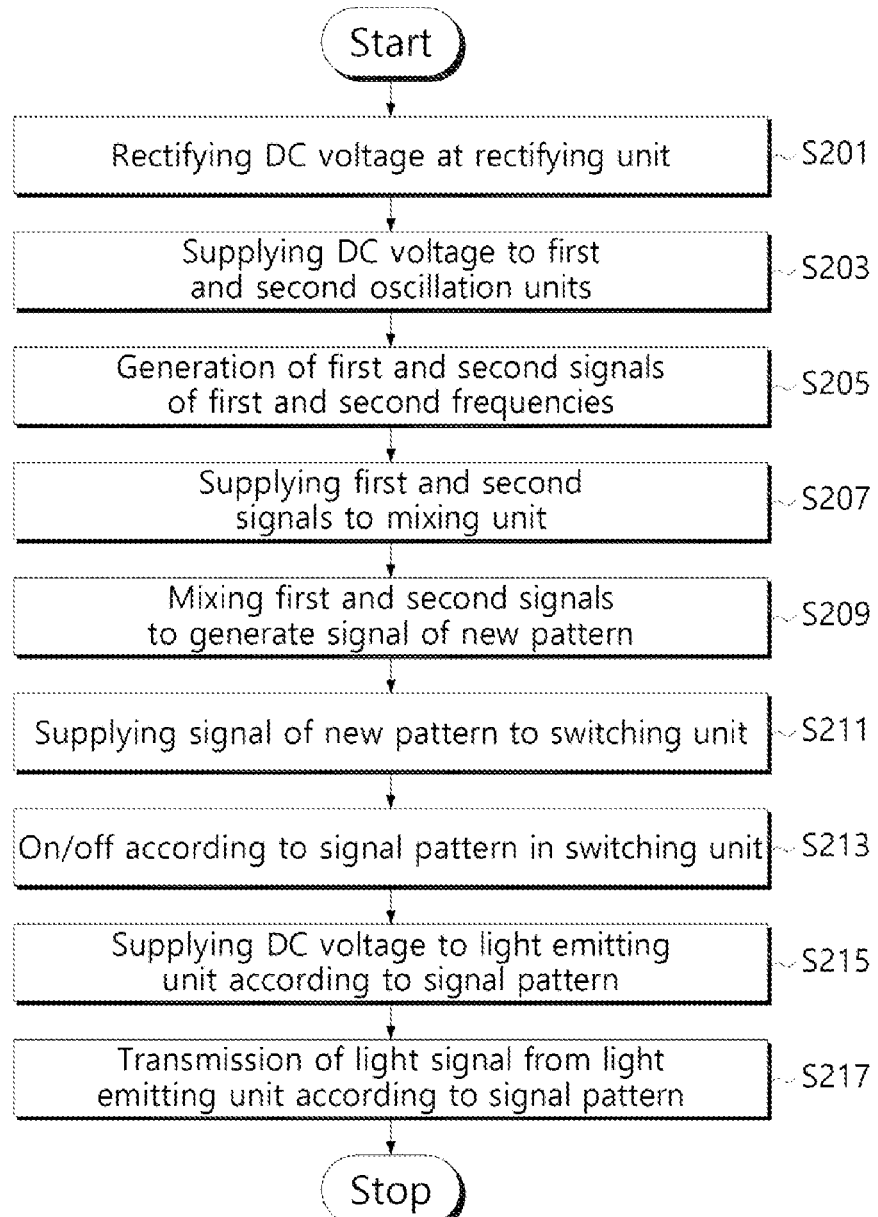
FIG. 21 is a flowchart illustrating a process of setting a signal pattern of a light signal transmitted from the light emitting unit according to an embodiment of the present disclosure.

FIG. 21 is a flowchart illustrating a process of describing a signal pattern of a light signal transmitted from the light emitting unit according to an embodiment of the present disclosure.

Referring to FIG. 21, in the present disclosure, the voltage generated in the second inductive coil 201 may be supplied to the driving unit 204.

The rectifying unit 2041 of the driving unit 204 may rectify the voltage into a DC voltage at S201.

The rectified DC voltage may be supplied to the first and second oscillation units 2042 and 2043, respectively at S203.

The first and second oscillation units 2042 and 2043 may generate first and second signals of the first and second frequencies, respectively, using the supplied DC voltage at S205.

The first and second signals may be input to the mixing unit 2044 at S207.

The mixer unit 2044 may output a signal of a new pattern by mixing the first and second signals of the first and second frequencies different from each other at S209.

The signal of the pattern output as described above may be input to the gate terminal of the switching unit 2045 at S211.

Then, the switching unit 2045 may perform on/off according to the signal pattern input to the gate terminal at S213, and may output a DC voltage of the rectifying unit 2041 to the light emitting unit 112 according to the signal pattern at S215.

The light emitting unit 112 may transmit the light signal according to the signal pattern at S217.

When the light signal is transmitted from the light emitting unit 112 as described above, the light receiving unit 311 may receive the light signal, thereby detecting the closure of the container lid 20 on the container body 10.

Meanwhile, in another embodiment, when the second oscillation unit 2043 is not provided in the driving unit 204, the second signal of the second frequency may be supplied to the mixing unit 2044 from the outside.

That is, the first oscillation unit 2042 generates the first signal of the first frequency, but the second signal of the second frequency may be received from an external device. The external device may be, for example, a remote controller capable of transmitting a light signal.

Even in this case, the mixer unit 2044 may output a signal of a new pattern by mixing the first signal and the second signal.

As described above, the signal pattern of the light signal transmitted from the light emitting unit 112 may be a signal obtained by combining the first signal and the second signal. In this case, since the second signal is a signal of a specific frequency preset by the user, the specific frequency is also included in the combined signal.

The light receiving unit 311 may receive the light signal of the signal pattern.

The controller 104 may determine whether the container lid 20 closes the container body 10 by analyzing the light signal of the signal pattern. That is, the closure of the container lid is detected by recognizing that a specific frequency preset by the user is included from the received light signal.

This is to clearly distinguish the light signal from separate light signals that are introduced from the outside according to the present embodiment.

The embodiments of the present disclosure have been described above with reference to the accompanying drawings, but the present disclosure is not limited to the above embodiments and may be manufactured in a variety of different forms. Those skilled in the art to which the present disclosure belongs will understand that the blender of the present disclosure may be embodied in other specific forms without changing the spirit or essential features of the present disclosure. Therefore, it should be understood that the embodiments described above are illustrative in all respects and not restrictive

The invention claimed is:

1. A blender comprising:
   a main body having a first inductive coil, a light receiving unit to receive a light signal, and a controller; and
   a container body having a second inductive coil to inductively couple to the first inductive coil, and a light emitting unit to receive a voltage generated by the inductive coupling between the first inductive coil and the second inductive coil to transmit the light signal,
   wherein the light emitting unit is configured to receive the voltage having a predetermined signal pattern generated by the inductive coupling between the first inductive coil and the second inductive coil and transmit the light signal having the predetermined signal pattern to the light receiving unit, wherein the light signal has the predetermined signal pattern having a unique frequency signal preset by a user, and
   wherein the controller is configured to analyze whether the unique frequency signal preset by the user is included in the light signal received by the light receiving unit and determine whether a container lid is closed on the container body.

2. The blender of claim 1, wherein the container body includes a driving unit to drive the light emitting unit,
   wherein the driving unit comprises:
   a rectifying unit to rectify the generated voltage to a DC voltage;
   a first oscillation unit to generate a first signal with a first frequency;
   a second oscillation unit to generate a second signal with a second frequency;

a mixing unit to mix the first and second signals to output a signal of the predetermined signal pattern; and a switching unit to turn on and off corresponding to the signal of the predetermined signal pattern to supply the DC voltage to the light emitting unit in the predetermined signal pattern.

3. The blender of claim 2, wherein the first and the second frequencies are 30 to 45 kHz and 0.5 to 5 kHz, respectively.

4. The blender of claim 2, wherein the driving unit comprises a linear and low-dropout (LDO) unit which is installed at an output terminal of the rectifying unit, the LDO unit to control the DC voltage output from the rectifying unit to follow a preset reference voltage.

5. The blender of claim 1, wherein the container body includes a driving unit to drive the light emitting unit, wherein the driving unit comprises:
a rectifying unit to rectify the generated voltage to a DC voltage;
a first oscillation unit to generate a first signal with a first frequency;
a signal receiving unit to receive a second signal with a second frequency input from the outside of the container body;
a mixing unit to mix the first and second signals to output a signal of the predetermined signal pattern; and
a switching unit to turn on and off corresponding to the signal of the predetermined signal pattern to supply the DC voltage to the light emitting unit in the predetermined signal pattern.

6. The blender of claim 5, wherein the first and the second frequencies are 30 to 45 kHz and 0.5 to 5 kHz, respectively.

7. The blender of claim 5, wherein the driving unit further comprises an LDO unit which is installed at an output terminal of the rectifying unit, the LDO unit to control the DC voltage output from the rectifying unit to follow a preset reference voltage.

8. The blender of claim 1, wherein
the container lid has a triggering member provided at a surface of the container lid,
wherein the inductive coupling is allowed between the first inductive coil and the second inductive coil according to a closure of the container lid on the container body.

9. The blender of claim 8, wherein the container body comprises:
a detection module to detect the triggering member,
wherein the inductive coupling is allowed between the first and second inductive coils according to the detection of the triggering member by the detection module.

10. The blender of claim 9, wherein the detection module comprises a switch turned on by the triggering member,
wherein the inductive coupling is allowed between the first and second inductive coils according to the triggering member positioned a predetermined distance to turn on the switch at the closure of the container lid on the container body.

11. The blender of claim 10, wherein the detection module is electrically connected to the second inductive coil by a conductive member made of a transparent material arranged in a longitudinal direction of the container body from an upper portion of the container body to a lower portion of the container body.

12. The blender of claim 11, wherein the conductive member comprises a transparent electrode film (ITO).

13. The blender of claim 12, wherein a first end of the transparent electrode film (ITO) is electrically connected to the detection module by a first connector which is detachable, and a second end of the transparent electrode film (ITO) is electrically connected to the second inductive coil by a second connector which is detachable.

14. The blender of claim 11, wherein the second inductive coil, the switch and the light emitting unit are connected in series, and when the switch is turned on, the second inductive coil, the switch and the light emitting unit form a closed circuit.

15. The blender of claim 1, wherein the first and second inductive coils are patterned on first and second printed circuit board (PCB) substrates, respectively, and wherein the first and second PCB substrates are attachable to and detachable from the main body and the container body, respectively.

16. The blender of claim 1, comprising a motor inside the main body, wherein the motor is allowed to operate according to the light signal having the predetermined signal pattern is received by the light receiving unit.

* * * * *